(12) United States Patent
Glorikian

(10) Patent No.: US 9,299,088 B2
(45) Date of Patent: Mar. 29, 2016

(54) INTERNET SYSTEM FOR CONNECTING CLIENT-TRAVELERS WITH GEOGRAPHICALLY-ASSOCIATED DATA

(71) Applicant: Crystal Development Consulting Services L.L.C., Wilmington, DE (US)

(72) Inventor: Harry A. Glorikian, Lexington, MA (US)

(73) Assignee: Cufer Asset Ltd. L.L.C., Wilmington, DE (US)

( * ) Notice: Subject to any disclaimer, the term of this patent is extended or adjusted under 35 U.S.C. 154(b) by 0 days.

(21) Appl. No.: 14/696,336

(22) Filed: Apr. 24, 2015

(65) Prior Publication Data

US 2015/0227976 A1    Aug. 13, 2015

Related U.S. Application Data

(60) Continuation of application No. 14/226,756, filed on Mar. 26, 2014, now abandoned, which is a continuation of application No. 11/469,554, filed on Sep. 1, 2006, now Pat. No. 8,725,120, which is a
(Continued)

(51) Int. Cl.
*G06F 15/173* (2006.01)
*G06Q 30/02* (2012.01)
(Continued)

(52) U.S. Cl.
CPC ........ *G06Q 30/0261* (2013.01); *G06F 17/3087* (2013.01); *G06N 5/02* (2013.01); *G06Q 30/0267* (2013.01); *H04L 29/12311* (2013.01); *H04L 61/2084* (2013.01); *H04W 4/028* (2013.01); *G01S 5/0027* (2013.01)

(58) Field of Classification Search
None
See application file for complete search history.

(56) References Cited

U.S. PATENT DOCUMENTS

| 4,395,624 A | 7/1983 | Wartski |
| 5,317,321 A | 5/1994 | Sass |

(Continued)

FOREIGN PATENT DOCUMENTS

| CA | 2255349 | 6/1999 |
| EP | 919787 | 6/1999 |

(Continued)

OTHER PUBLICATIONS

Baudhuin, E.S., "Telemaintenance Applications for the Wearable PC," IEEE Conference, Oct. 1996, pp. 407-413.
(Continued)

*Primary Examiner* — Joshua Joo
(74) *Attorney, Agent, or Firm* — Perkins Coie LLP

(57) ABSTRACT

A multi-dimensional information repository storing data structures and tags associated with individual ones of the data structures. The data structures are tagged according to locations and defined regions relative to the surface of the Earth, and a data retrieval system retrieves information from the data structures according to location data accompanying requests for data. Data structures can also be tagged relative to time in addition to location and defined regions, and both tags can be used in retrieving data structures. A subscription server using the data repository can have a communication module for receiving data requests accompanied by location data and a code set for managing retrieval of information from the data repository. The subscription server can use the accompanying location data to determine a location in pre-defined regions, and use the pre-defined region information to retrieve information related to the pre-defined regions in response to the data requests.

20 Claims, 9 Drawing Sheets

Related U.S. Application Data division of application No. 09/502,407, filed on Feb. 10, 2000, now abandoned, which is a continuation-in-part of application No. 09/474,458, filed on Dec. 29, 1999, now Pat. No. 6,343,317.

(51) Int. Cl.
| | | |
|---|---|---|
| *G06F 17/30* | (2006.01) | |
| *H04L 29/12* | (2006.01) | |
| *G06N 5/02* | (2006.01) | |
| *H04W 4/02* | (2009.01) | |
| *G01S 5/00* | (2006.01) | |

(56) References Cited

U.S. PATENT DOCUMENTS

| | | | |
|---|---|---|---|
| 5,327,144 A | 7/1994 | Stilp et al. | |
| 5,470,233 A | 11/1995 | Fruchterman et al. | |
| 5,497,339 A | 3/1996 | Bernard | |
| 5,541,845 A | 7/1996 | Klein | |
| 5,552,989 A | 9/1996 | Bertrand | |
| 5,633,622 A | 5/1997 | Patterson | |
| 5,638,077 A | 6/1997 | Martin | |
| 5,682,525 A | 10/1997 | Bouve et al. | |
| 5,689,431 A | 11/1997 | Rudow et al. | |
| 5,699,255 A | 12/1997 | Ellis et al. | |
| 5,717,392 A | 2/1998 | Eldridge | |
| 5,717,923 A | 2/1998 | Dedrick | |
| 5,731,978 A | 3/1998 | Tamai et al. | |
| 5,757,916 A | 5/1998 | MacDoran et al. | |
| 5,774,828 A | 6/1998 | Brunts et al. | |
| 5,802,492 A | 9/1998 | DeLorme et al. | |
| 5,848,373 A | 12/1998 | DeLorme et al. | |
| 5,892,454 A | 4/1999 | Schipper et al. | |
| 5,895,436 A | 4/1999 | Savoie et al. | |
| 5,901,352 A | 5/1999 | St-Pierre et al. | |
| 5,905,450 A | 5/1999 | Kim et al. | |
| 5,919,246 A | 7/1999 | Waizmann et al. | |
| 5,933,100 A | 8/1999 | Golding | |
| 5,938,721 A | 8/1999 | Dussell et al. | |
| 5,945,948 A | 8/1999 | Buford et al. | |
| 5,948,040 A | 9/1999 | DeLorme et al. | |
| 5,959,577 A | 9/1999 | Fan et al. | |
| 5,964,821 A | 10/1999 | Brunts et al. | |
| 5,978,770 A | 11/1999 | Waytena et al. | |
| 5,982,281 A | 11/1999 | Layson, Jr. | |
| 5,983,158 A | 11/1999 | Suzuki et al. | |
| 5,999,124 A | 12/1999 | Sheynblat | |
| 6,014,090 A | 1/2000 | Rosen et al. | |
| 6,020,847 A | 2/2000 | Upton et al. | |
| 6,021,371 A | 2/2000 | Fultz | |
| 6,023,241 A | 2/2000 | Clapper | |
| 6,026,375 A | 2/2000 | Hall et al. | |
| 6,028,514 A | 2/2000 | Lemelson et al. | |
| 6,046,689 A | 4/2000 | Newman | |
| 6,047,327 A | 4/2000 | Tso et al. | |
| 6,049,711 A | 4/2000 | Ben-Yehezkel et al. | |
| 6,052,081 A | 4/2000 | Krasner | |
| 6,072,396 A | 6/2000 | Gaukel | |
| 6,073,075 A | 6/2000 | Kondou et al. | |
| 6,078,865 A | 6/2000 | Koyanagi | |
| 6,081,780 A | 6/2000 | Lumelsky | |
| 6,087,983 A | 7/2000 | Ho et al. | |
| 6,088,598 A | 7/2000 | Marsolais | |
| 6,091,956 A | 7/2000 | Hollenberg | |
| 6,091,959 A | 7/2000 | Souissi et al. | |
| 6,097,316 A | 8/2000 | Liaw et al. | |
| 6,111,539 A | 8/2000 | Mannings et al. | |
| 6,115,611 A | 9/2000 | Kimoto et al. | |
| 6,122,520 A | 9/2000 | Want et al. | |
| 6,140,943 A | 10/2000 | Levine | |
| 6,140,957 A | 10/2000 | Wilson et al. | |
| 6,144,920 A | 11/2000 | Mikame | |
| 6,150,961 A | 11/2000 | Alewine et al. | |
| 6,151,505 A | 11/2000 | Larkins et al. | |
| 6,157,841 A * | 12/2000 | Bolduc et al. | 455/456.5 |
| 6,166,685 A | 12/2000 | Soliman | |
| 6,169,497 B1 | 1/2001 | Robert | |
| 6,199,045 B1 | 3/2001 | Giniger et al. | |
| 6,202,023 B1 * | 3/2001 | Hancock et al. | 701/516 |
| 6,208,934 B1 | 3/2001 | Bechtolsheim et al. | |
| 6,222,483 B1 | 4/2001 | Twitchell et al. | |
| 6,236,365 B1 | 5/2001 | LeBlanc et al. | |
| 6,236,933 B1 | 5/2001 | Lang | |
| 6,236,938 B1 | 5/2001 | Atkinson et al. | |
| 6,246,958 B1 | 6/2001 | Hirono | |
| 6,266,612 B1 | 7/2001 | Dussell et al. | |
| 6,266,614 B1 | 7/2001 | Alumbaugh | |
| 6,266,615 B1 | 7/2001 | Jin | |
| 6,278,944 B1 | 8/2001 | Lui et al. | |
| 6,317,594 B1 | 11/2001 | Gossman et al. | |
| 6,330,858 B1 | 12/2001 | McDonough et al. | |
| 6,331,825 B1 * | 12/2001 | Ladner et al. | 340/988 |
| 6,343,317 B1 | 1/2002 | Glorikian | |
| 6,353,398 B1 | 3/2002 | Amin et al. | |
| 6,360,165 B1 | 3/2002 | Chowdhary | |
| 6,363,320 B1 | 3/2002 | Chou | |
| 6,363,419 B1 | 3/2002 | Martin et al. | |
| 6,381,603 B1 | 4/2002 | Chan et al. | |
| 6,385,622 B2 | 5/2002 | Bouve et al. | |
| 6,392,661 B1 | 5/2002 | Tankersley | |
| 6,397,040 B1 | 5/2002 | Titmuss et al. | |
| 6,401,034 B1 | 6/2002 | Kaplan et al. | |
| 6,415,227 B1 | 7/2002 | Lin | |
| 6,418,146 B1 | 7/2002 | Miloslavsky | |
| 6,430,411 B1 | 8/2002 | Lempio et al. | |
| 6,452,544 B1 | 9/2002 | Hakala et al. | |
| 6,504,571 B1 | 1/2003 | Narayanaswami et al. | |
| 6,526,351 B2 | 2/2003 | Whitham | |
| 6,529,143 B2 | 3/2003 | Mikkola et al. | |
| 6,529,159 B1 | 3/2003 | Fan et al. | |
| 6,552,682 B1 | 4/2003 | Fan | |
| 6,571,279 B1 * | 5/2003 | Herz et al. | 709/217 |
| 6,574,548 B2 * | 6/2003 | DeKock et al. | 701/117 |
| 6,608,556 B2 | 8/2003 | De Moerloose et al. | |
| 6,677,894 B2 | 1/2004 | Sheynblat et al. | |
| 6,691,106 B1 | 2/2004 | Sathyanarayan | |
| 6,754,485 B1 | 6/2004 | Obradovich et al. | |
| 6,772,213 B2 | 8/2004 | Glorikian | |
| 6,826,472 B1 | 11/2004 | Kamei et al. | |
| 6,859,833 B2 | 2/2005 | Kirsch et al. | |
| 6,868,320 B1 | 3/2005 | Burch | |
| 6,983,139 B2 | 1/2006 | Dowling et al. | |
| 7,047,302 B1 * | 5/2006 | Chatani et al. | 709/229 |
| 7,069,228 B1 | 6/2006 | Rose et al. | |
| 7,165,123 B2 | 1/2007 | Hindman | |
| 7,714,778 B2 | 5/2010 | Dupray | |
| 7,877,290 B1 | 1/2011 | Arsenault et al. | |
| 8,572,198 B2 * | 10/2013 | Jhanji | 709/206 |
| 8,725,120 B2 | 5/2014 | Glorikian | |
| 2001/0001133 A1 | 5/2001 | Hotta | |
| 2001/0056327 A1 | 12/2001 | Jin | |
| 2002/0046259 A1 | 4/2002 | Glorikian | |
| 2002/0047787 A1 | 4/2002 | Mikkola et al. | |
| 2002/0171650 A1 | 11/2002 | Prabhakaran | |
| 2003/0081119 A1 | 5/2003 | Robinson et al. | |
| 2003/0083931 A1 | 5/2003 | Lang | |
| 2003/0229446 A1 | 12/2003 | Boscamp et al. | |
| 2004/0039504 A1 | 2/2004 | Coffee et al. | |
| 2004/0102197 A1 * | 5/2004 | Dietz | 455/456.1 |
| 2004/0192351 A1 | 9/2004 | Duncan | |
| 2004/0201500 A1 | 10/2004 | Miller et al. | |
| 2005/0125152 A1 | 6/2005 | Fuchs et al. | |
| 2005/0203835 A1 | 9/2005 | Nhaissi et al. | |
| 2006/0031428 A1 | 2/2006 | Wikman | |
| 2006/0184313 A1 | 8/2006 | Butler | |
| 2007/0021915 A1 | 1/2007 | Breed et al. | |

(56) References Cited

U.S. PATENT DOCUMENTS

| | | |
|---|---|---|
| 2007/0027619 A1 | 2/2007 | Kato |
| 2009/0254971 A1 | 10/2009 | Herz et al. |
| 2014/0297416 A1 | 10/2014 | Glorikian |

FOREIGN PATENT DOCUMENTS

| | | |
|---|---|---|
| JP | 11065434 | 6/1989 |
| JP | 08076706 | 3/1996 |
| JP | 08138193 | 5/1996 |
| JP | 09275371 | 10/1997 |
| JP | 92057501 | 10/1997 |
| JP | 10062200 | 3/1998 |
| JP | 10170301 | 6/1998 |
| JP | 10185609 | 7/1998 |
| JP | 11064014 | 3/1999 |
| JP | 11142179 | 5/1999 |
| JP | 11183595 | 7/1999 |
| JP | 11250393 | 9/1999 |
| JP | 11285053 | 10/1999 |
| JP | 11304506 | 11/1999 |
| WO | WO-9427268 | 11/1994 |
| WO | WO-9957700 | 11/1999 |
| WO | WO-0148624 | 7/2001 |

OTHER PUBLICATIONS

Budvytetye et al., "Dynamoto Dynamic Story for Mobile Tourist," 2004, Dept. of Computer Science, Aalborg University, Denmark, 16 pp.

Elhakeem, A.K., "MYMAR, A New Mobile Yellow Page Messaging and Retrieval, The Advent of the Local Wireless Internet," IEEE Conference, Mar. 2000, pp. 1014-1017.

Falkenberg et al., "The AirStar—A Precision GPS Parallel Swath Guidance and Tracking System," IEEE Symposium, Apr. 1994, pp. 274-283.

Gonzalez-Castano, F.J. et al., "Bluetooth location networks," IEEE Global Telecommunications Conference, 2002, vol. 1, pp. 233-237.

International Search Report for Application No. PCT/US2000/35250; Applicant: Harry A. Glorikian; Date of Mailing Apr. 4, 2001, 1 p.

Kottkamp et al. "Location-aware query processing in mobile database systems," ACM Symposium on Applied Computing Jun. 1998, pp. 416-423.

Nobuyuki Miura, "Location-oriented Structuring and Filtering of Information—Mobile Info Search 3 Experiment," Research Report of Information Processing Society, Japan, Information Processing Society of Japan, Nov. 26, 1999, vol. 99, No. 97, pp. 39-44.

Pitoura et al., "Distributed Location Databases for Tracking Highly Mobile Objects," *Computer Journal*, Oct. 2000, vol. 44, issue 2, pp. 75-91.

Ruggaber et al., "Using WAP as the Enabling Technology for COBRA in Mobile and Wireless Environments," IEEE workshop on Future Trends of Distributed Computing Systems, Dec. 1998, pp. 69-74.

Yoon et al. "COPEN: a COBRA-based intelligent push-engine," IEEE Asia Pacific Software Engineering Conference, Dec. 1998, pp. 330-337.

Apple, IAd Brands advertisement, <http://advertising.apple.com/brands/>, Jan. 18, 2001, 2 pp.

European Patent Office, Supplementary European Search Report, EP Application 00989478.3, Nov. 14, 2007, 3 pages.

United States Patent and Trademark Office, Non-Final Office Action, U.S. Appl. No. 09/474,458, mailed Feb. 28, 2001, 12 pages.

United States Patent and Trademark Office, Final Office Action, U.S. Appl. No. 09/474,458, mailed Jul. 30, 2001, 10 pages.

United States Patent and Trademark Office, Notice of Allowance, U.S. Appl. No. 09/474,468, mailed Oct. 5, 2001. 3 pages.

United States Patent and Trademark Office, Non-Final Office Action, U.S. Appl. No. 09/502,407, mailed Jul. 15, 2003, 12 pages.

United States Patent and Trademark Office, Final Office Action, U.S. Appl. No. 09/502,407, mailed Nov, 14, 2003, 11 pages.

United States Patent and Trademark Office, Non-Final Office Action, U.S. Appl. No. 09/502,407, mailed May 17, 2004, 8 pages.

United States Patent and Trademark Office, Final Office Action, U.S. Appl. No. 09/502,407, mailed Feb. 22, 2005, 9 pages.

United States Patent and Trademark Office, Non-Final Office Action, U.S. Appl. No. 09/502,407, mailed Aug. 22, 2005, 8 pages.

United States Patent and Trademark Office, Final Office Action, U.S. Appl. No. 09/502,407, mailed Mar. 2, 2006, 10 pages.

United States Patent and Trademark Office, Non-Final Office Action, U.S. Appl. No. 10/006,346, mailed Aug. 1, 2003, 10 pages.

United States Patent and Trademark Office, Final Office Action, U.S. Appl. No. 10/006,346, mailed Nov. 21, 2003, 10 pages.

United States Patent and Trademark Office, Non-Final Office Action, U.S. Appl. No. 10/006,346, mailed Apr. 19, 2004, 9 pages.

United States Patent and Trademark Office, Final Office Action, U.S. Appl. No. 10/006,346, mailed Oct. 19, 2004, 10 pages.

United States Patent and Trademark Office, Non-Final Office Action, U.S. Appl. No. 10/006,346, mailed Aug. 22, 2005, 10 pages.

United States Patent and Trademark Office, Final Office Action, U.S. Appl. No. 10/006,346, mailed Mar. 2, 2006. 11 pages.

United States Patent and Trademark Office, Final Office Action, U.S. Appl. No. 10/006,346, mailed Jan. 26, 2007. 7 pages.

United States Patent and Trademark Office, Final Office Action, U.S. Appl. No. 10/006,346, mailed Jul. 26, 2007, 8 pages.

United States Patent and Trademark Office, Non-Final Office Action, U.S. Appl. No. 10/006,346, mailed Jan. 8, 2008, 15 pages.

United States Patent and Trademark Office, Final Office Action, U.S. Appl. No. 10/006,346, mailed Sep. 30, 2008, 16 pages.

United States Patent and Trademark Office, Advisory Action, U.S. Appl. No. 10/006,346, mailed Dec. 16, 2008, 3 pages.

United States Patent and Trademark Office, Non-Final Office Action, U.S. Appl. No. 10/006,346, mailed Mar. 17, 2009, 12 pages.

United States Patent and Trademark Office, Final Office Action, U.S. Appl. No. 10/006,346, mailed Jun. 17, 2009, 14 pages.

United States Patent and Trademark Office, Non-Final Office Action, U.S. Appl. No. 10/006,346, mailed Feb. 22, 2010, 7 pages.

United States Patent and Trademark Office, Non-Final Office Action, U.S. Appl. No. 10/121,801, mailed Oct. 22, 2003, 14 pages.

United States Patent and Trademark Office, Notice of Allowance, U.S. Appl. No. 10/121,801, mailed Apr. 26, 2004. 3 pages.

United States Patent and Trademark Office, Notice of Allowance, U.S. Appl. No. 10/121,801, mailed May 17, 2004, 4 pages.

United States Patent and Trademark Office, Non-Final Office Action, U.S. Appl. No. 11/469,554, mailed Sep. 16, 2009. 6 pages.

United States Patent and Trademark Office, Non-Final Office Action, U.S. Appl. No. 11/469,554, mailed Apr. 14, 2010, 15 pages.

United States Patent and Trademark Office, Final Office Action, U.S. Appl. No. 11/469,554, mailed Sep. 2, 2010, 15 pages.

United States Patent and Trademark Office, Advisory Action, U.S. Appl. No. 11/469,554, mailed Nov. 15, 2010, 3 pages.

United States Patent and Trademark Office, Non-Final Office Action, U.S. Appl. No. 11/469,554, mailed Dec. 21, 2012. 18 pages.

United States Patent and Trademark Office, Final Office Action, U.S. Appl. No. 11/469,554, mailed Apr. 19, 2013. 24 pages.

United States Patent and Trademark Office, Non-Final Office Action, U.S. Appl. No. 11/469,554, mailed Aug. 12, 2013. 25 pages.

United States Patent and Trademark Office, Notice of Allowance, U.S. Appl. No. 11/469,554, mailed Dec. 26, 2013. 17 pages.

United States Patent and Trademark Office, Non-Final Office Action, U.S. Appl. No. 11/226,756, mailed Aug. 13, 2014. 8 pages.

United States Patent and Trademark Office, Non-Final Office Action, U.S. Appl. No. 14/226,756, mailed Jan. 26, 2015, 24 pages.

\* cited by examiner

INTERNET SYSTEM FOR CONNECTING CLIENT-TRAVELERS WITH GEOGRAPHICALLY-ASSOCIATED DATA

CROSS-REFERENCE TO RELATED APPLICATIONS

This application is a continuation of U.S. application Ser. No. 14/226,756, filed Mar. 26, 2014, which is a continuation of U.S. application Ser. No. 11/469,554, filed Sep. 1, 2006, now U.S. Pat. No. 8,725,120, which is a divisional of U.S. application Ser. No. 09/502,407, filed Feb. 10, 2000, which is a continuation-in-part of U.S. application Ser. No. 09/474,458, filed on Dec. 29, 1999, now U.S. Pat. No. 6,343,317. Each of the applications listed above is hereby incorporated by reference in its entirety.

TECHNICAL FIELD

The present invention is in the field of Internet services and business models, pertains more particularly to apparatus, methods, and models for providing a service tracking geographic location of clients of the system, and providing information to the clients based on the tracked location.

BACKGROUND

The well-known Internet and the subset of the Internet known as the World Wide Web (WWW) is arguably the greatest present net repository and source of information available to persons enabled by suitable equipment to and connect to myriad Internet servers and download information. Enabling equipment for end users includes all computerized machines capable of establishing an Internet connection and of asserting addresses known as Universal Resource Locators (URLs) to connect to individual servers and pages on servers (Web pages), and of communicating in the language of the Internet. Such enabling equipment may be broadly termed Internet appliances, and include in aggregate large Internet-connected servers (which may be enabled to browse and connect to other Internet servers), desk-top personal computers, which typically connect to the Internet through telephone lines and Internet Service providers (ISPs), Web TVs, computerized set-top boxes typically using cable services for connection, and a wide variety of portable computerized units (portable computers).

The latter category of portable computers is of primary interest in the present invention, and includes an increasingly diverse set of equipment taking a variety of names. Among these are laptop computers, palmtop computers, hand-held computers, personal digital assistants (PDAs), personal organizers, cellular telephones, and many more. To fall into the class of Internet appliances it is only required that such portable units be enabled to connect somehow to the Internet backbone, and be able to browse the Internet through some level of executable software, which ability may be enhanced or largely provided by Internet-connected proxy machines.

The Internet and Internet-related enterprise services, as of the time of the present patent application, have been growing at a very great rate, and one important reason for emergence of many new services is the sheer volume and resulting granularity of the Internet. A person accessing the Internet can be reasonably assured that the information he or she might seek is out there somewhere. Finding it, however can be another matter entirely.

A broad variety of services have been developed to help individuals locate information on the Web, among them quite sophisticated browser software executable on the end-user's Internet appliances, powerful search engines available on proxy servers to browse for subscribers and other clients, and indexing and listing services which attempt to track and cross-reference Internet information sources. For the purposes of the present specification, a client is a person who uses a service, while a subscriber is a client who registers and/or pays for using a service Even with enormous effort going into new and better indexing and searching services, partly because of the rate of growth of sources and end users as well, there has been but little improvement in ability to quickly find and easily access information on the Web. Browsing the Internet can still be a daunting task, especially for the relatively uninitiated client. The present inventors have recognized, therefore, a need to narrowly focus information services to provide highly specialized information specific to needs and specialized interests of groups of individual clients, and automatically or semiautomatically provided to such clients.

SUMMARY

In a preferred embodiment of the present invention a multi-dimensional information repository is provided, comprising plurality of stored data structures; one or more tags associated with individual ones of the plurality of data structures; and a data retrieval system. The repository is characterized in that data structures are tagged according to locations and defined regions relative to the surface of the Earth, and the retrieval system retrieves information from the data structures according to location data accompanying requests for data. In some cases individual ones of the plurality of data structures are tagged according to time in addition to location and defined regions, and both tags are used in retrieving data structures. Individual ones of the plurality of data structures may be tagged according to human interest categories in addition to locations and defined regions and time.

In another aspect of the invention an Internet-connected subscription server system is provided, comprising a data repository having data structures tagged according to locations and defined regions relative to the surface of the Earth; a communication module for receiving data requests accompanied by location data; and a code set for managing retrieval of information from the data repository in response to the data requests. This system, receiving a data request, uses the location data accompanying the request to determine location in individual ones of pre-defined regions, and uses the pre-defined region information to access data structures and retrieve information related to the pre-defined regions for transmission in response to the data requests.

In some embodiments of the system data structures are tagged according to time data in addition to location, data requests include time data, and the system accesses data structures in part according to the time data. In some preferred embodiments the system maintains subscriber information profiles, including subscriber interests, data requests identify individual subscribers, data structures are tagged according to interest categories, and the system accesses data structures in part according to the stored interests of the subscriber initiating a data request.

In yet another embodiment the data repository is a first data repository local to the Internet server, and the system, though the code set, accesses remote Internet-connected information sources, and retrieves information from said remote sources according to one or more of stored client interests and the location data accompanying the client's request.

DETAILED DESCRIPTION

Figure 1:
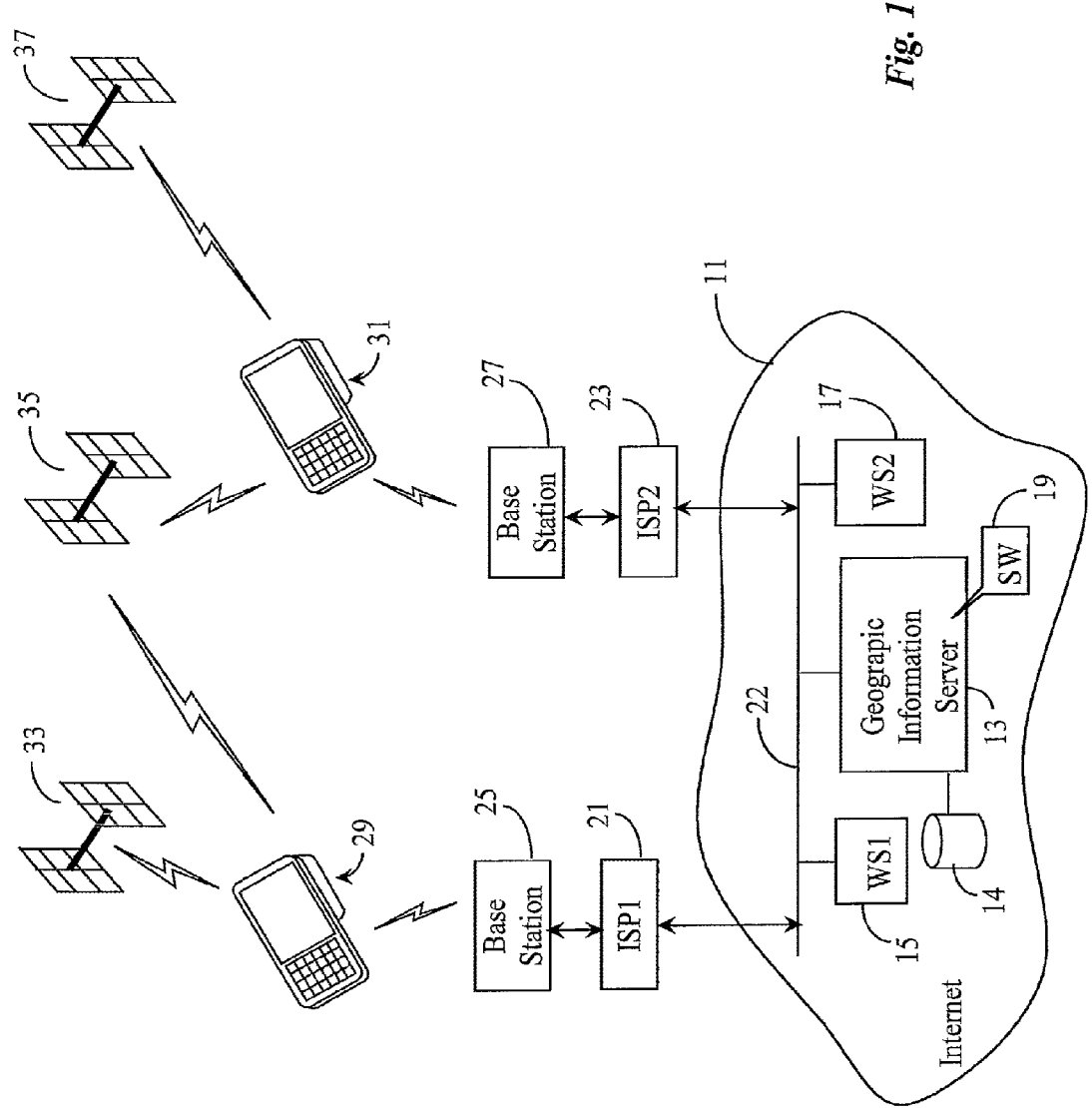
FIG. 1 is a block diagram illustrating an exemplary architecture for a service and business model according to a preferred embodiment of the present invention.

FIG. 1 is a block diagram illustrating an exemplary architecture for an Internet-implemented service and business model according to a preferred embodiment of the present invention. In this system a service is provided on an Internet-connected server 13 in the well-known Internet network represented by cloud 11. The service provided is particular to travelers, such as, for example, tourists, who are enabled typically with unique, hybrid hand-held units that are capable of informing server 13 regarding specific geographic location of the units, and therefore the person (client) using each unit.

In FIG. 1 two client's appliances 29 and 31 are represented as portable, hand-held computer units. In this embodiment each of units 29 and 31 are Palm™ hand-held computers enabled to connect to the Internet through integrated cellular telephone equipment via base stations. Unit 29 connects through base station 25 and ISP1 21 to Internet backbone 22, which represents all of the loosely defined interconnections of nodes and servers worldwide.

Base station 25 represents many base stations in a cellular telephony provider's network of such stations enabling cell user's to connect typically to a public switched telephone network (PSTN), hence to an ISP and to the Internet backbone. In some cases the cellular provider may provide the ISP service directly. The skilled artisan will recognize this diagram is exemplary, and will be aware of the various ways this wireless connection may be implemented.

In an alternative embodiment connection to the Internet for units 29 and 31 and similar units is provided through a Wireless Internet Protocol (WAP) technology, using systems and protocols according to the new WAP cooperative industry standard. In the WAP technology the wireless devices, such as units 29 and 31 connect wirelessly to a WAP-enabled service provider (WAP-SP) connecting to the Internet. In this embodiment server 31 enables according to the present invention could be integrated as a WAP-SP, or could be a separate server in the Internet accessible by the WAP-SP.

Unit 31 in the present example connects to Internet backbone 22 via representative base station 27 and ISP2 23, but in alternative embodiments could connect through WAP technology as described above. As users of units 29 and 31 move about geographically, as long as the units are on and powered, wireless connection may be maintained by connection through different stations in the cellular provider's base station network.

Figure 2:
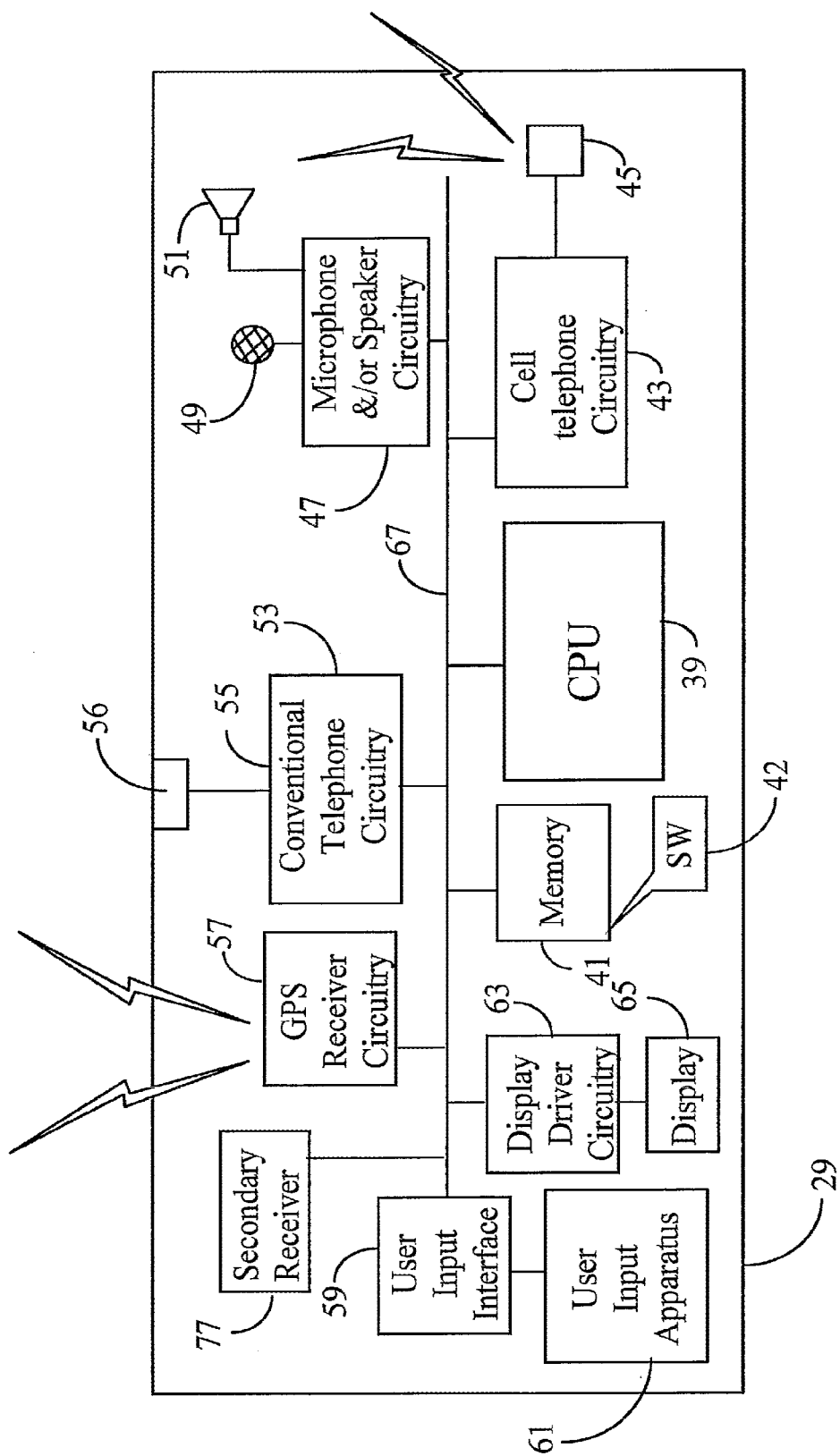
FIG. 2 is a diagram of basic elements of an Internet appliance of FIG. 1.

FIG. 2 is a block diagram of internal elements of hand-held unit 29 of FIG. 1, including exemplary connectivity. The present invention pertains most particularly to portable computing units, of which there are many varieties, as described above in the background section. In a preferred embodiment unit 29 is a modified or enhanced Palm™ hand-held computer device. In this preferred embodiment the unit has cellular telephone circuitry which serves as a connection path for Internet communication, and this combination is known in the art.

Unit 29, as shown in FIG. 2 has a central processing unit (CPU) 39 and a system memory 41 communicating on an internal bus 67. The CPU and the nature of the memory will vary depending upon the nature of unit 29. The CPU, for example, may be an Intel Pentium™ microprocessor if unit 29 is a portable laptop computer. Memory 41 may include read-only memory (ROM), such as a basic input-output system (BIOS), random access memory (RAM) for temporary storage, and non-volatile memory such as a hard-disk drive or a flash memory, or any combination of known memory-storage apparatus.

In a preferred embodiment a cellular telephone circuitry 43 connected to bus 67 and operating through an antenna 45 provides connection to a public switched telephone network (PSTN) through a cellular telephony provider's network as described above, hence to an Internet service provider such as ISP1 or ISP2 of FIG. 1, to Internet backbone 22 (also FIG. 1). Unit 29 is enhanced with Internet browser software (not shown) to be able to access and browse the Internet world. In some embodiments the browser software is a commercially available product, and in other embodiments may be an available browser enhanced with one or more plug-ins according to embodiments of the invention, and in yet other embodiments may be wholly provided as unique software according to embodiments of the present invention. In some embodiments the browsing will be done principally at the network (source) end, and data presentation at the hand-held unit will be by other than browser technology.

In some embodiments conventional telephone circuitry 53 is provided connected to a telephone connector 56, for Internet access, and this circuitry may be in addition to or in lieu of circuitry 43. For example, a laptop computer enabled to practice the present invention may have only circuitry 55, comprising a data modem and, in some cases voice circuitry as well, while a Palm™ implementation may have only the cellular connection apparatus.

Common to most implementations of unit 29, there will be display driver circuitry 63 and a display 65, for displaying information from Internet sources as well as for performing other routine output functions, and a user input interface 59 and input apparatus 61. Input apparatus 61 comprises, for example, a keyboard and a pointer device. In some embodiments of unit 29 there will be one or both of a microphone and speaker circuitry 47 and one or both of a microphone 49 and a speaker 51. It is also important to understand that many implementations of client units such as units 29 and 31 may have more or fewer elements than shown in FIG. 2.

Common to all examples of units 29 and 31, there is a GPS circuitry 57 for receiving signals from multiple GPS satellites and for determining a location for the unit from the satellite signals. Such GPS systems are known in the art, but not necessarily in combination with other elements as disclosed herein. GPS system 57 communicates on bus 67, and the net effect is, that in operation, the geographic position of unit 29 on the Earth's surface, accurate to within a few feet at the most, is available to CPU 39 at all times that the unit is in operation.

In some (OEM) embodiments of the invention the GPS apparatus is integrated into the circuitry of the portable units. In others, an add-on GPS unit is provided that may be attached to and connected to an existing portable unit already having the cell-telephone capability or other Internet connectivity. In still other cases an add-on unit may be provided that adds cell-telephone capability and GPS capability to an existing portable computing unit that has neither capability. Such add-on units may connect through a standard serial port, a universal serial port (USB), a parallel port, such as the port typically used for printers, and so on. Physical attachment may be made in a number of ways so the resulting assembled unit is convenient to use.

In practice of a preferred embodiment of the present invention specific information is transmitted (downloaded) from, through, or initiated by Internet server 13 in response to requests from a portable unit (29, 31), the request in preferred embodiments is accompanied by global positioning data defining the global position of the requesting unit. In a preferred embodiment the portable unit (29, 31) is enhanced with software 42 that, among other duties, accesses the Internet and asserts the URL of server 13 when the unit is powered on. In the case of WAP technology, this access may be wireless access to a WAP-SP. Thenceforth periodic requests are transmitted from the portable unit along with GPS position, updating the info to server 13. In other embodiments software 42 may provide a user interface allowing the user to select the service of the present invention, such as by selecting an icon on a desktop screen, as is known in the art, to initiate the service of the invention.

Software 42 operating on the user's appliance may take many forms, and may have many functions and duties, many of which are described in more detail below. This software, in general, is fashioned to provide a user interface and information presentation functions particular to the embodiments of the invention.

It will be apparent to the skilled artisan that requests from portable units may be identified as specific to individual units (ID) in several ways. The typical protocol for such requests, for example, includes transfer of a cookie which may identify the individual unit, the cookie having been provided by the service to the client unit at the time of initial log-in. Processes and protocols for log-in and authentication are well-known in the art, and new processes are being developed to make the process more secure as well as more transparent to the user.

Referring now back to FIG. 1, a client using unit 29, for example, moving about geographically, with unit 29 on and operating, is connected to server 13 through Internet backbone 22, which represents all of the loosely defined Internet connection and interconnection pathways. Server 13 may have local access to a data repository 14 of any convenient type and size, upon which may be stored any convenient information. Server 13 also has access through backbone 22 to the rest of the Web, represented by Web servers WS1 15 and WS2 17, which may have access to other databases and yet other repositories.

In a preferred embodiment a service is provided to such as tourists and other travelers, wherein information of, for example, historical interest is stored accessible to server 13 and indexed by global position, and in some cases also by dynamics of global position.

As an example of such a service, a tourist, also a client of a service, according to an embodiment of the present invention, may be making a walking tour of Colonial Williamsburg in the U.S. state of Virginia. Colonial Williamsburg, as is well-known, is a superbly-maintained historical site presenting buildings and artifacts pertaining to the original settlements by Western Europeans along the James river in Virginia, and includes the Jamestown colony, first peopled during the reign of James the First of Britain in the early part of the 17th century, considerably prior to the landing of the pilgrims at Plymouth in the state of Massachusetts. The landing of the pilgrims, by the way, occurred on the outer island of Cape Cod, and these pilgrims were originally bound for the Jamestown site.

This tourist, for example, may be presented with information pertaining to items of very local interest. The tourist, a client of the enterprise host of server 13, may be walking along the James River on the plot known as Martin's Hundred, which was established in 1617 by a group from London, arriving on the ship Gift of God. This client will be pushed information about the history of Martin's Hundred, the people who participated, and what happened there.

In a preferred embodiment, because GPS positioning is quite accurate, down to at most an error of less than three feet, the granularity of the information selection can be quite high. For example, as the client walks or rides in broad areas of Martin's hundred not immediately adjacent to any specific, more limited (lower-level) historical site, information of a general nature is pushed to the client's portable device. As the client nears John Boys' house on the banks of the James River, specific information about John Boys (who was titular head of Martin's Hundred for a time) and his family will be pushed. As the client walks toward a trash pit near this site, where archeologists have discovered the remains of a servant of the Boys household, who crawled there, grievously injured, during the Powhatten uprising in the early 1620's, hid under the refuse, and died there of her injuries, details of the Indian uprising may be pushed, along with details of this archeological site.

The historical information pushed under these circumstances may be selected by software at server 13 based on more than the simple location of the portable unit. The direction of change in location may be used as well, and the rate of change, and other dynamics derivative from location and time. The information pushed, for example would be different if the client walks toward the rubbish site from the Boys' house, as opposed to walking from the rubbish site towards the house. In the first case the info would be about the rubbish site, and associated information, and in the second about the house and its occupants, even though the actual GPS position may be the same. The use of the dynamic data in information selection and granularity is unique.

As an example of a use of rate of change, a client at Martin's Hundred might well move from site to site on an electric cart, or by automobile, and walk around at each site. In such a case, the software at server 13 may present information quite differently. If the client is seen to be moving at a rate consistent with a vehicle, the service can provide site-to-site information, scripted also by direction of movement. If the client is seen to be moving at a walking rate, the information is more granular and specific, related to an individual site, and so forth.

There are many variations in practicing the invention that may depend, for example, on the nature of the client's Internet appliance (that is, its capabilities and characteristics), and this client-profile information may be available to the service at server 13, and be accessed to determine what to push to a client, and how to push it. For example, in some embodiments a client may be using a laptop computer connectable to the Internet only through a standard telephone connector and modem. The laptop computer in this case, of course, in preferred embodiments of practice of the invention, is enabled by a GPS system, so, when connected to server 13, the laptop reports its position. If the client is a subscriber, the client's profile, stored at server 13, will indicate the nature of the laptop and connectability, and information will be selected and pushed at a relatively high and general level, as suitable for the situation.

A lot of detail about the nature of historical information to be made available to clients is not necessary in this specification. The volume of such information, concerning civil war sites, genealogical sites and information, historical sites in other parts of the world (Western Europe, for example, and much more, is readily available to imagination of the skilled artisan.

Information to be indexed by geography (location) is certainly not limited to historical information, but extends to many other kinds of information, and the type of information to be provided may be selectable by a client. Archeological information may be provided, including information about local geography, mineral deposits, water supplies and the like. Information about local government offices, local cemeteries, local museums and exhibition sites, and so forth may be prepared and made available to clients. Another information shell could be organized around economic information, such as local industry, small businesses, and the like. Historical data about a region may be organized around not only geographical position, but relative to time as well. For example, all sorts of data as mentioned above may be provided for any different period of time (era) that a client may desire. There are thus a vary great variety of information shells and granularity relative to geographic position, time frame, and real time that may be organized and made available to clients. All such data is organized in the provider's database, or in databases accessible to the host of the service. It is an object of the invention to make information available to clients on a basis of the individual client's interest as well as geographical and time dimensions.

It was described above that portable units to practice the present invention may vary widely in components and architecture. The mode in which information is provided may, in many cases, be strongly influenced by the architecture of the units used. In many cases, for example, information downloaded to field units will be presented to the user in audible mode. This may be done in any of several ways. For example, in some cases the portable field unit may have text-to speech software, and downloaded text is converted at the unit to synthesized speech. In other cases, text may be displayed; along with graphics in some cases as well. In yet other embodiments information to a client in the field may be sent in analog or digital audio format, and rendered audible through the circuitry and speaker system at the field unit.

Indoor Application Embodiments

It is well-known that presently-available GPS systems are workable only out-of-doors, while cellular telephone systems typically work quite well indoors. This is in part because signals from satellites are diffuse, and therefore the signal strength at any point on the Earth's surface is relatively low, while cellular telephone and other wireless protocol signals are much stronger. It is also well known that many sites of interest to tourists and travelers, where information may well be organized by location, are inside buildings where GPS may not be serviceable directly.

As an example of an indoor exhibit where an embodiment of the present invention would be quite useful, consider the Metropolitan Museum of Art in Manhattan, NYC, on the Upper East Side (about 81st and Fifth Avenue on the Central Park side). This museum is in very large buildings and typically has a large number of exhibits for divergent interests. There are, for example, collections of armor and weaponry, collections of paintings organized by type, by artist, and in other ways, visiting collections of art and artifacts from other countries and cultures, and so forth. For the purposes of this invention, information about all of the exhibits at this museum may be indexed according to geographic location in the buildings, which may be accessed selectively if one has a portable unit requesting such information from a database while simultaneously reporting the device's relatively precise position in the museum.

Figure 3:
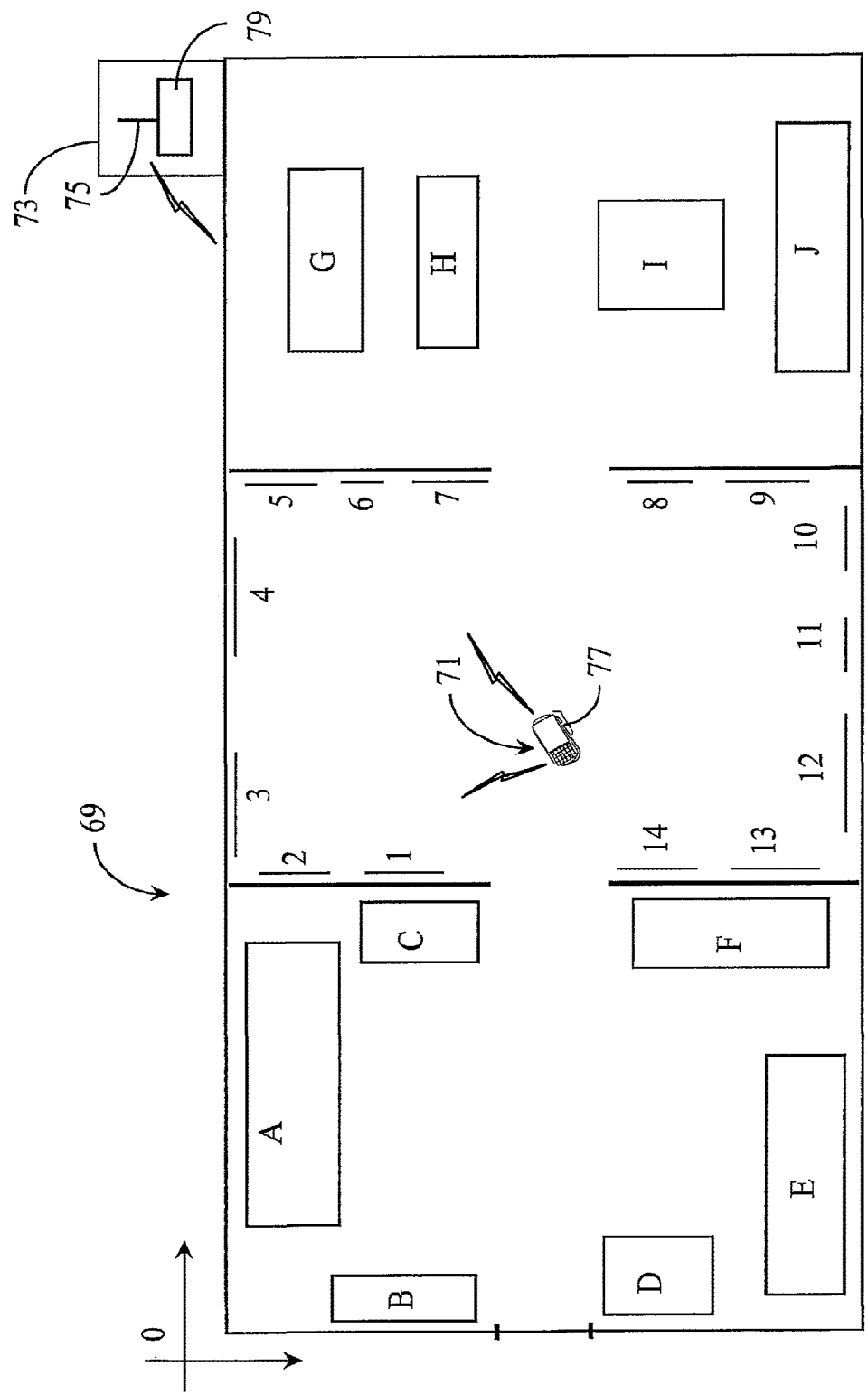
FIG. 3 is a plan view of an indoor exhibition facility in an embodiment of the present invention.

FIG. 3 is a plan view of a simple, exemplary indoor exhibiting site 69 with indoor exhibits organized in specific locations within the site, according to an embodiment of the present invention. There is an entrance/exit in this example, and there are three exhibit rooms, as shown in the Fig. Exhibits in cases A through J are arranged in rooms 1 and 3, and paintings (1) through (14) are hung on the walls of room 2. All exhibits may be documented in an information database by location from an arbitrary reference point, such as point 0 as shown at the upper left corner of site 69. This is a simple Cartesian reference system listing locations of exhibits in two dimensions from reference point 0. In other embodiments there may be a three-dimensional reference system, allowing for differentiation of exhibits on multiple levels of a multi-storied exhibit site, or any known sort of planar or spatial reference system.

In this embodiment of the invention a secondary communication link is opened between Internet appliance 71 and a location system 73 provided by the host of the indoor exhibit. The purpose of this communication is to establish the position and dynamics of movement of a user of appliance 71 within the confines of the indoor exhibit. The skilled artisan will recognize that there are alternative ways this may be done. In one embodiment a secondary receiver is provided in appliance 71 receiving on an RF frequency common to sending equipment used for the purpose by cooperating enterprises that host indoor exhibits. This receiver is represented in FIG. 2 by secondary receiver 77. Multiple stations within the exhibit premises may be used with triangulation techniques for tracking movement of users, for example. In another alternative embodiment there may be small transmitters of limited range at strategic points within the exhibit premises, and the appliance may determine its position according to signals received by secondary receiver 77, much as a GPS system does.

Within the indoor facility appliance 71 with secondary receiver 77 communicates with station 73 via antenna 75 and circuitry 79. This facility is meant to be representative of any wireless indoor system capable of locating a user's appliance relatively precisely within an indoor facility.

In one embodiment the secondary position system simply determines the position of the user of appliance 71 within the exhibitor's facility, and this information is passed to server 13 on the Internet. Server 13 is informed not only of this position, but of the fact that this is not a GPS position, and also the ID of the exhibition facility. In this embodiment the host of the service provided by server 13 maintains, with cooperation of the host of the exhibition facility, a database relating exhibits according to geographic and spatial position within the facility, and returns information to the appliance user relating to the various exhibits.

Again, dynamic position information may be used to relate to the database as well as simple position within a facility. For example, the fact of a user traversing from one room to another may elicit information pertaining to the nature of exhibits in the room being approached, while the fact of a user stopping for a predetermined time before a specific exhibit may elicit information about that specific exhibit, and so forth. In this alternative embodiment, the database for the exhibit may be maintained and updated by the host of server 13 with input from the host of the exhibit facility.

In an alternative embodiment server 13 may simply establish an Internet connection to an Internet-connected source maintained by the host of the exhibit, and, through cooperative software and communication protocol, the information is pulled from the exhibitor's facility and pushed to the user of the appliance via the cellular Internet connection.

In yet another embodiment the entire information service for an indoor exhibition facility is provided at the facility, and system 73 at the facility determines not only the user's position, but pulls the information and pushes it to the user via the communication link between element 77 and system 73. In some cases element 77 in the user's appliance may be a transmitter as well as a receiver.

Referring now back to FIG. 2, the typical appliance in embodiments of the present invention has a speaker 51 and a microphone 49. These elements may be used with suitable software and the like to use the appliance as a cell telephone and to accomplish computer simulated telephony over the Internet, often termed IP calls. In some embodiments information pushed to a user may be rendered as speech and announced to the user, who may use earphones or an ear-piece speaker system.

Figure 4:
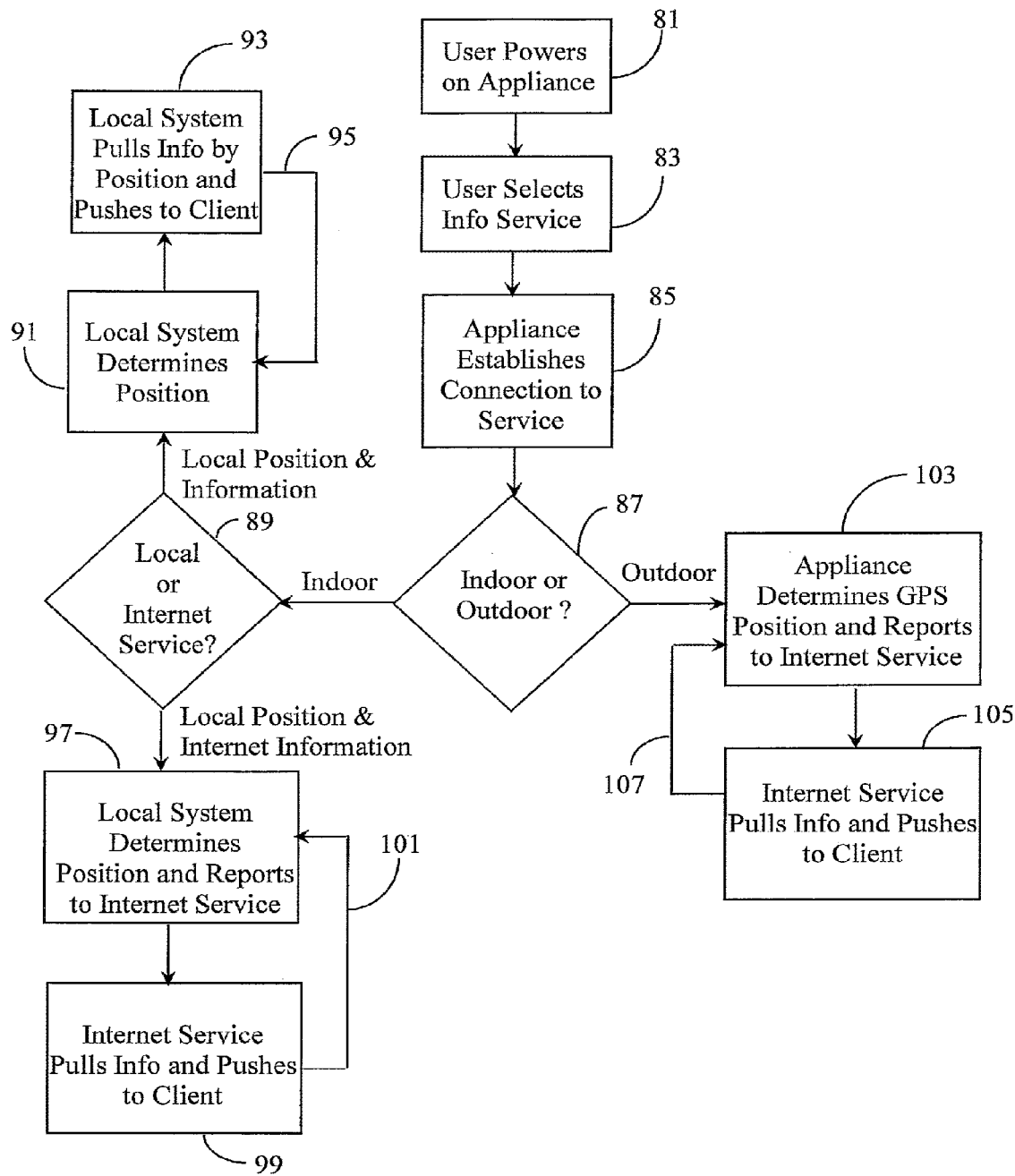
FIG. 4 is a logic flow diagram illustrating steps in practicing the invention in preferred embodiments.

FIG. 4 is a logic flow diagram illustrating a series of steps in practicing the present invention. At step 81 a user/client powers on an appliance enables according to an embodiment of the present invention. At step 83 the client selects the information service according to an embodiment of the invention. This step may not exist in some embodiments. For example, in some embodiments simply powering on the appliance will select the information service. This is a dedicated embodiment. In other embodiments the service is optional, and the appliance may be used for many other functions.

At step 85 the appliance establishes connection to the service. This connection typically involves logging onto the Internet through the cell telephone service, and making the Internet connection. It will be apparent to the skilled artisan that this may be done transparently to the user, or may require user intervention.

At step 87 the appliance determines if the service is to be for an indoor or an outdoor facility. This may be as simple as the presence or absence of a GPS signal received by the appliance's GPS system. In the event the service is indoor, the appliance will receive identifying and initializing input from the local position system.

If the application is indoor, the identification will determine in step 89 whether the particular service is local position only, with Internet information, or both local position and information. For the local position and information system, control goes to step 91, and the local system determines position, and the position, and in some cases dynamic information derived from changes in position relative to time, is used to pull information and push it to the client. The process loops (95) continuing to tell position and pass information until such time as the user intervenes, or some basic parameter changes. Although this loop is shown as between steps 91 and 93, in reality the loop may be back to, for example, step 87 at least periodically, so, if the client exits the building, the system may switch to the outdoor service.

If at step 89 the determination is that the service is local position but Internet information, the appliance determines local position at step 97 (communication with local position system) and passes the position data to the Internet service, which pulls info and pushes it to the client at step 99. Again, dynamic data may be determined and used as well, as previously described, and the system continues to loop (101) re-determining position and continuing to access and push information. The loop may periodically revert at least to step 87 as well, as also previously described.

If, at step 87 it is determined that the appliance is out-of-doors, which may be determined by the access to and strength of a GPS signal, control passes to step 103, where the appliance determines the GPS position and passes that to the Internet service, which pulls the relevant information at step 105 and pushes it to the client. Return logic path 107 indicates that, as the client outdoors continues to move around, the system accesses different information, by position and dynamic data derived from position and change in position, and continues to push the data to the client.

It will be apparent to the skilled artisan that the flow diagram of FIG. 4 is but one rendition of steps that may depict practice of the present invention in various embodiments. The order of steps may vary in different embodiments, some steps shown in FIG. 4 may not be present in some other embodiments, and in some embodiments there may be steps not shown in FIG. 4.

Intermittent Service

In an alternative embodiment of the present invention, useful in situations where Internet access may not be readily available on a continuing basis, or may be relatively expensive, portions of a database maintained by a host of the service may be downloaded by a user/client, based on current or expected location, and stored locally accessible to the client's portable unit. In this case a user interface allows the client, while maintaining Internet access, to specify the kind of information desired and the geographic location of interest. The relevant information is then downloaded, such as, for example, information about Colonial Williamsburg or the Metropolitan Museum of art. The client, having the relevant information stored locally, such as on a flash card, floppy disk, or hard disk drive, may then operate in the specific area, accessing the locally-stored information by real-time GPS position, just as in the Internet-connected situation described above.

Advertisement

The inventor recognizes that broad practice of the present invention will create a new opportunity for commercial enterprises to advertise products and services. Such advertisement in Internet models and services is at present quite well-known. Practice of the present invention, however, presents a unique opportunity for adding a previously unknown dimension to such advertisement. Now advertisement can be focused for services desirable to tourists and other travelers to just such persons, these being people enabled by the apparatus and service of the present invention, and moreover, offers of products and services to the enabled portion of the population can be made in a geographically-focused manner.

As an example of geographic focusing of advertisement, consider the traveler previously described as visiting Colonial Williamsburg, in Virginia. Such a tourist will likely have made arrangements (reservations) in advance for travel and overnight accommodations. This does not mean, however, that the person is completely satisfied with the arrangements. The actual aspect of accommodations after arrival, compared to what was advertised, is frequently one of the big surprises of a trip.

Because travelers may become dissatisfied with arrangements made in advance, there is good reason to suppose that some may be moved to change those accommodations if good information is presented. In an embodiment of the present invention, therefore, the host of the Internet-based service or of the indoor facility that pushes its own information locally to enabled clients, may arrange with hotels, motels, tour services, eateries, and the like, also indexed and selectable by geography, to provide advertisements to the enabled clients. The traveler visiting Colonial Williamsburg may be presented with availability of overnight accommodations, restaurants, and the like, in the immediate vicinity of Colonial Williamsburg.

There are a number of ways that advertisements may be focused and presented without being offensive to the travelers. For example, in one embodiment all advertisement is pushed to the traveler's portable unit, and cached in memory 41 (FIG. 2) under control of software 42. A display interface is provided (such as a selectable icon) that allows the traveler to access the advertisements as desired. It is left up to the traveler to determine the access. For example, at lunch time, or when hunger strikes, the traveler may simply access the cache and peruse a short list of local lunch establishments. Alternatively, the caching of such advertisements may be made at the Internet-based service for the traveler and based on the traveler's position as reported by virtue of the GPS capability. In this case the traveler accesses the cache through Internet request rather than from the local memory of the portable unit.

The geographic filtering nature of the service of the invention creates further selectability and granularity that may be of large advantage to both travelers and advertisers. For example, advertisements sent to the traveler's portable device may be updated as the traveler moves about, so that advertisements outside of the traveler's instant location are not presented. In the embodiment described wherein advertisements are cached and the traveler is given a measure of control over the access and display, ads are removed from the cache as the traveler moves about, this movement reported to the service by virtue of the GPS capability.

There is still further service that may be provided for travelers. In the case of advertisement, the service can arrange with advertisers to keep a record of availability of services offered by the advertisers, such as rooms available at a bed-and breakfast. A traveler looking for a better accommodation may then make arrangement (reservation) through the information service of the present invention. The same applies to dinner and lunch reservations, tour services, who may advertise their schedules and availability, and so forth.

In yet another embodiment of the invention services may be provided to both travelers and advertiser clients based on the identification and location of the travelers using the hosted service. The service, by virtue of transmission of and return of cookies by a client, knows where the client is and, in some cases, where the client is going to be. Arrangements may be made with such as large exhibitors, such as in the example of the Metropolitan Museum of Art described above, to notify the exhibiting hosts of the presence of or pending arrival of clients of the service, such that special offers and arrangements may be made for the individual clients, and personal service may be rendered.

Database Structure, Configuration and Use

The organization of the databases or databases in embodiments of the present invention is unique as are methods in accessing and dynamically restructuring the databases. For purposes of the following explanations and descriptions database (singular) is used, but it must be understood that there may be several associated databases in use at any particular time.

In the following discussion of database topics it is important to understand that the information categorized, stored, and accessed in embodiments of the invention is not limited to any one language. It is intended that end-users of any nationality and language may be enabled according to embodiments of the invention, and information may be stored in any language, translated dynamically as required, and provided in the best form according to needs of different users. In some cases this means there will be redundancy in the database, and the necessary redundancy is provided.

Figure 5:
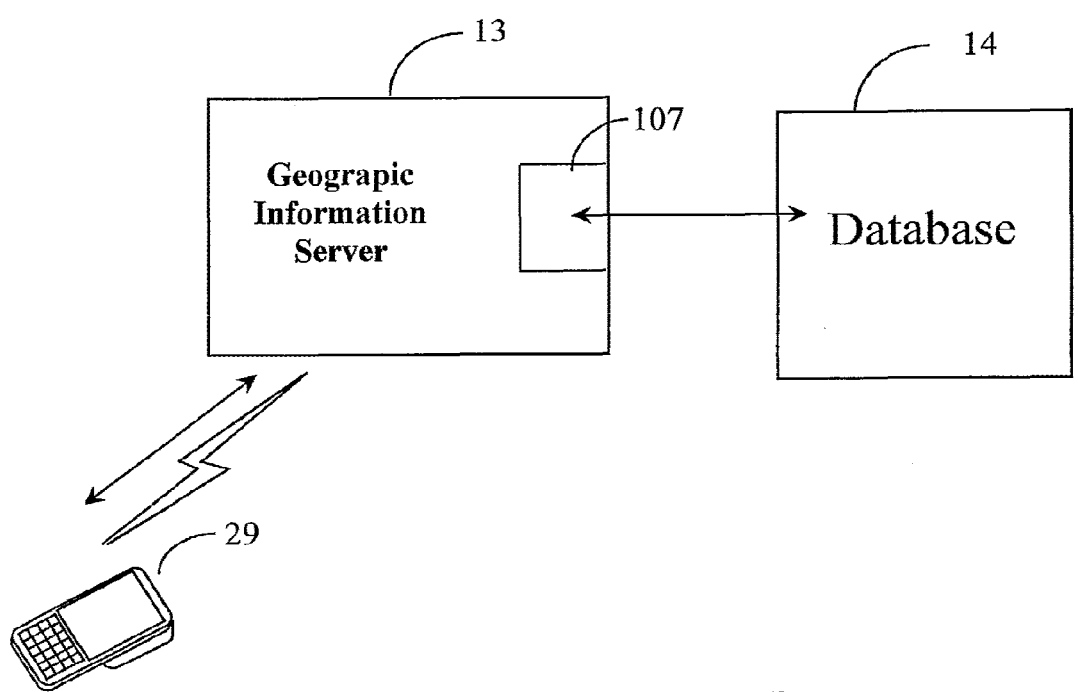
FIG. 5 is a block diagram illustrating a configuration interface to a database according to an embodiment of the present invention.

FIG. 5 is a block diagram illustrating communication between field device 29 and database 14 through a configuration interface 107 in information server 13 to database 14 in an embodiment of the present invention. FIG. 5 is intentionally general to represent a wide variety of situations within the scope of the invention. For example, a general two-way communication is represented between field unit 29 and server 13, and this communication can be implemented in any one of various ways described above, including several wireless and land-line methods and apparatus. Further, database 14 may represent data storage local to server 13 or remote but accessible, and can be implemented in a broad variety of hardware and software.

Configuration interface 107 represents the interface between incoming requests from user/clients and the associated database. In preferred embodiments Interface 107 is primarily a software suite, but may also comprise, in some embodiments, hardware elements. There are several unique aspects and features in this interface and the structure of the associated database.

The kinds of data and information assembled for users in databases 14 have been briefly explained above. Generally the assembled information is related to geography. The kinds of information stored and the various dimensions of the databases is explained in more detail below:

(A) GPS Boundaries and Regions

An important dimension of the databases is position on the Earth's surface. Depending on purpose and application, the position may be relatively general, or very, very precise. For example, a position may be described as within a particular state, or alternatively (and at the same time) at a very precise coordinate on the Earth's surface. To accomplish this purpose, at a relatively general level, the surface of the Earth is mapped according to GPS boundaries, as well as precise GHPS position. The GPS boundaries may follow, for example, boundaries of continents, boundaries of countries, and boundaries of regions within countries and other regions, which may be somewhat arbitrary to the service itself, and so on. These boundaries define GPS regions that are identified in various ways, and the identifications are used as cross-references in the database.

The GPS regions defined as database references are in some cases very general and in others quite granular and specific. For example, the Southern Hemisphere and the Northern hemisphere of the Earth, defined by the equator, are identified each as a separate GPS region. In any query the GPS position, if any, accompanying or associated with the query, may be identified quickly as within either the Northern or the Southern hemisphere. In any case of a reported position falling on a boundary, rules apply for defining the location relative to defined GPS regions. In some such cases the position will be confined to one or the other region, and in some cases both. In still other cases the position may be determined as associated with a defined GPS region according to dynamic data of user movement, and so on.

At a slightly more detailed level GPS boundaries are defined for all continents and ocean regions, according to geography without respect to political considerations (national jurisdiction and the like). At a still more detailed level GPS regions are defined for boundaries of countries and territories according to national jurisdiction. In many cases these GPS regions will define several areas. For example the contiguous states of the United States of America, and then separate areas for Alaska, Hawaii, and territories of the United States.

GPS boundaries may be established also crossing national boundaries. For example, there may be a definition for boundaries of river drainage regions of the world, which may, of course cross national boundaries, such as the drainage region of the Amazon River in South America. Another GPS boundary category of interest is economic regions, such as the European Economic Community and other such trade regions.

At a still more detailed level. GPS boundaries are defined for regions of interest in larger countries and regions. For example, the Southern States of the US, the Western states of the US, the New England areas of the US, the various provinces of Canada, the various countries in Europe, the desert regions within any country, the provinces within France, for instance, the counties in the State of Indiana in the United States, the voting districts in any democratic jurisdiction, the city limits of any major city anywhere in the world, the limits of villages below a certain population in Ireland, and so on, and so forth.

At a still more detailed level, GPS boundaries may be established and defined for sites on the surface of the Earth according to any of several information categories. As an example, organized World War II sites in Europe may be defined, such as the regions of the Battle of the Bulge, the location of cemeteries and monuments, and the like. Regions may be defined for Civil War sites in the US in much the same way, defining regions for major and minor battles, cemeteries, organized sites like Gettysburg and Andersonville and Fredericksberg and the like, as well as sites that are not formally organized.

At another level, commercial boundaries may be defined as GPS boundaries as well. In such a category locations of restaurants within easy driving distance of the center of Cincinnati, Ohio may be defined as a GPS boundary. The same might be done for men's clothing stores in upper Manhattan in New York City, and so forth.

At a very specific and detailed level information is stored related to specific exhibition sites, for example, and the result is specific to very small regions. The example of an indoor site, such as the Metropolitan Museum of Art in New York City was described above. In this case small regions may be defined such that the system may be able to access information about a painting, for example, related to a region of a few square feet at most, within which a person is standing to conveniently view the painting. In this case, as described above, a portable unit may report to the system a specific and relatively exact position within the museum, and the system can locate that position within a small region in front of a painting hanging on a wall of the museum. The system then "knows" to pass information to the user/client about that specific painting. The system may even know, for example, if the client is facing the painting or not, or make an educated guess, based on very recent history of the client's movement.

In the situation of an exhibition site such as a museum neutral regions may also be defined, being regions not associated with any specific display. For example, a defined region in the Met may encompass all of the floor area in a room further than six feet from any wall. The system, recognizing a user position in such a region may deliver, for example, general information about what may be found on which walls of the room within which the user is located.

The identification of defined GPS regions may be done in any of several ways. In one embodiment regions are assigned metadata designations, in which each defined region has a unique digital designation. A table is prepared and stored for each region in which the boundaries of the region are defined and related to the identity of the region. In processing, when a GPS position is reported or accompanies an information request in some fashion, the system may enter the table structure and quickly establish all of the defined GPS regions bounding the reported position. Then, as information is stored in the database related to defined regions, information may be easily and reliably accessed according to region. In another aspect, once the regions are defined for a request, the user's profile may also provide other information that may be used to further refine the nature of a database inquiry and response to the user's request. The particular user may, for example, have requested that certain kinds of information not be sent.

(B) The Time Database Dimension

The position database dimension has been described in some detail above. Another dimension used in the database is time. Time boundaries for purposes of embodiments of the present invention are defined in a similar manner to position boundaries. For example, time boundaries may be defined for past, present and future, defining thereby three defined time regions. Time regions within the past region may be defined in a wide variety of ways; for example each past millennium, each 100 years within each millennium, each ten year period, each year, and so on down to very small time intervals in some cases. Some data may be associated in the time dimension as present, or real time. Future time may be defined in intervals similarly to the intervals for past time.

In some cases time intervals may be defined for subject matter. As an example, civil war data may be tagged as to the year in which certain events occurred, such as 1861, 1862, 1863, 1864 and so forth. Similar divisions may be defined for many other special categories, including wars, presidential terms, dynasties in ancient China, and so forth.

(C) The Personal Interest Dimension

Another, and very important, database dimension in embodiments of the present invention is personal interest. Interest categories are defined for database relationships according to very broad and very narrow categories. For example art may be a very broad category. Within the category of art there may be subcategories for painting, sculpture, music, literature, and so forth. Within the subcategories there may be further granularity, such as Impressionist painting, modern, surreal, and so forth. Similar granularity is established within other art categories, such as classical music, hip-hop, jazz, country, big band, and so forth.

Another example of interest category is history, which may be have sub categories for regional, ethnic, dynasty, monarchies, history of particular countries, history of particular cultures, and much, much more. There may be categories at broad and more detailed levels for all areas of human interest, only a very few of which are mentioned here; but the skilled artisan will recognize, given the present teaching that interest is a very broad category (D) Commercial Enterprises Commercial enterprises are a special database category, and information is stored, tagged and otherwise cross-referenced for many commercial enterprises, such as hotels and motels, bed-and-breakfast establishments, restaurants, bus tour services, railroads, airlines, taxi services, beauty shops, barbershops, doctors and hospitals, and many, many more established businesses and government services world-wide, in every necessary language. There are many uses in embodiments of the invention at many levels for such information, as is made apparent in further descriptions below.

I some cases information about certain commercial establishments is relatively limited, such as nature of goods and services, telephone numbers, and address. In other cases the relationship may extend to on-line connectability between the present service in many embodiments, and call-centers, web pages, and the like hosted by the commercial establishments made a part of the database of the present invention.

It will be apparent to the skilled artisan, given the teachings herein, that most information stored in the database of the present invention will relate to more than one, and in many cases, several database dimensions. For example, detailed information about the battle of Hoover's Gap in the US state of Tennessee during the Civil War, at which battle the 17th Indiana Mounted Infantry first used repeating Spencer rifles, will be tagged as positionally in the Northern hemisphere, in North America, in the USA, in the state of Tennessee, and in the county or region where the battle took place. In the time dimension the time region is the past, in the 19th century, in the sixth decade, in the year it occurred, and specifically by the exact dates and times.

In the personal interest dimension for the Hoover's Gap example above the categorizations may be war, civil war, US Civil War, land battles, and so forth. There may be many more tags and cross-references for personal interest as well. Commercial enterprises associated with this battle may include present-time hotels, motels, eating establishments, and the like, which are in the region where the battle was fought.

It will be apparent to the skilled artisan, given the teachings herein, that there may be several more database dimensions utilized within the scope of the invention.

There are a variety of ways information in the database may be tagged or otherwise cross referenced in line with the dimensions described, and other dimensions. For example, information may be grouped in most instances according to some close relationship. For example, all information about Colonial Williamsburg may be grouped by the particular fact of being about Colonial Williamsburg. Regardless of physical grouping, this information will be tagged as history, US history, colonial history, and so forth in the area of personal interest. The information will be further tagged according to particular periods in US history.

For this example of Colonial Williamsburg specific site information will be tagged according to position on-site, and according to defined regions within the bounds of Colonial Williamsburg. A GPS position within the defined bounds of this site will be recognized as such for purposes of accessing information, and within the region, detailed information about specific sites is related more closely to exact position.

There are a variety of ways data tagging may be done. Typically data elements in the database structure will be tagged by a digital word of suitable length, different bits at different significance positions providing the dimensional information. In a 64-bit word, for example, 16 bits may be reserved for positional specification, 16 bits for time specification, 16 bits for interest, and 16 more bits for other classification. There are many methods known in the art for data tagging.

Accessing the Database and Examples of Services Provided

Referring again to FIG. 5, requests of many sorts may come to server 13 from enabled appliances from anywhere on Earth, and in literally any language. Device 29 in FIG. 5 is meant to represent any appliance that may be able to access the on-line service, such as a desktop computer, a laptop computer, another web site, a cell telephone, a caller to a call-center via a conventional telephony service, or via an enabled WAP or cellular-enabled device having also GPS capability as described above. In examples below, methods of accessing and sorting are described by specific examples of defined services in embodiments of the invention.

Continuous on-Site Access and Delivery—

In one example above, in a preferred embodiment, a traveler/client has a hand-held device enabled to access the Internet in a wireless manner, and also to track its own position via an integrated GPS system. A traveler with such a device may at any point in time initialize the device and access the services in embodiments of the present invention generally represented by server 13 in this specification.

In this situation the device may be a completely dedicated device, so when it is powered on, contact with server 13 is established automatically and transparently, and maintained until intentionally terminated by the client. In other cases the device may have multiple uses, and a client may be required to select the service of embodiments of the present invention through a convenient user interface, such as a graphic interface displayed. The means and protocol of access is not particularly material to the invention.

In this example, in the initial contact with the Internet-enabled service of the invention, the service typically identifies the client and sends a cookie, which is lodged at the client device in a cookie file. This process is known in the art, and may require the user to fill out a log-in form with such as a user-name and a password pair, which may be a remembered pair automatically entered in the form by the user's device. In other embodiments the log-in and confirmation may be done transparently to the user of the client device. In some instances authentication is not particularly critical, because no secure or sensitive information is downloaded in the process. In others higher levels of security are required. Typically, after initialization and until the client intentionally terminates, the filed cookie is used in further communication to maintain authentication and client identity with the service.

Device as Client—

Further to the above, there are embodiments of the invention wherein the device itself is the client, rather than a particular person who is the owner and operator of the device, and this situation is covered below firstly. This situation attains, for example, at highly organized exhibit sites. Such sites are, for example, the Metropolitan Museum of Art in New York City and Colonial Williamsburg in Virginia, used in previous examples, or, as a new example, the San Francisco Zoo. At such sites, through cooperation between the services of the present invention and the host of each site, client devices may be provided for use by visitors. There are many possibilities in how such devices may be provided and maintained, accounted for, and so forth, and how the users visiting such sites may pay for the service, if at all.

Figure 6A:
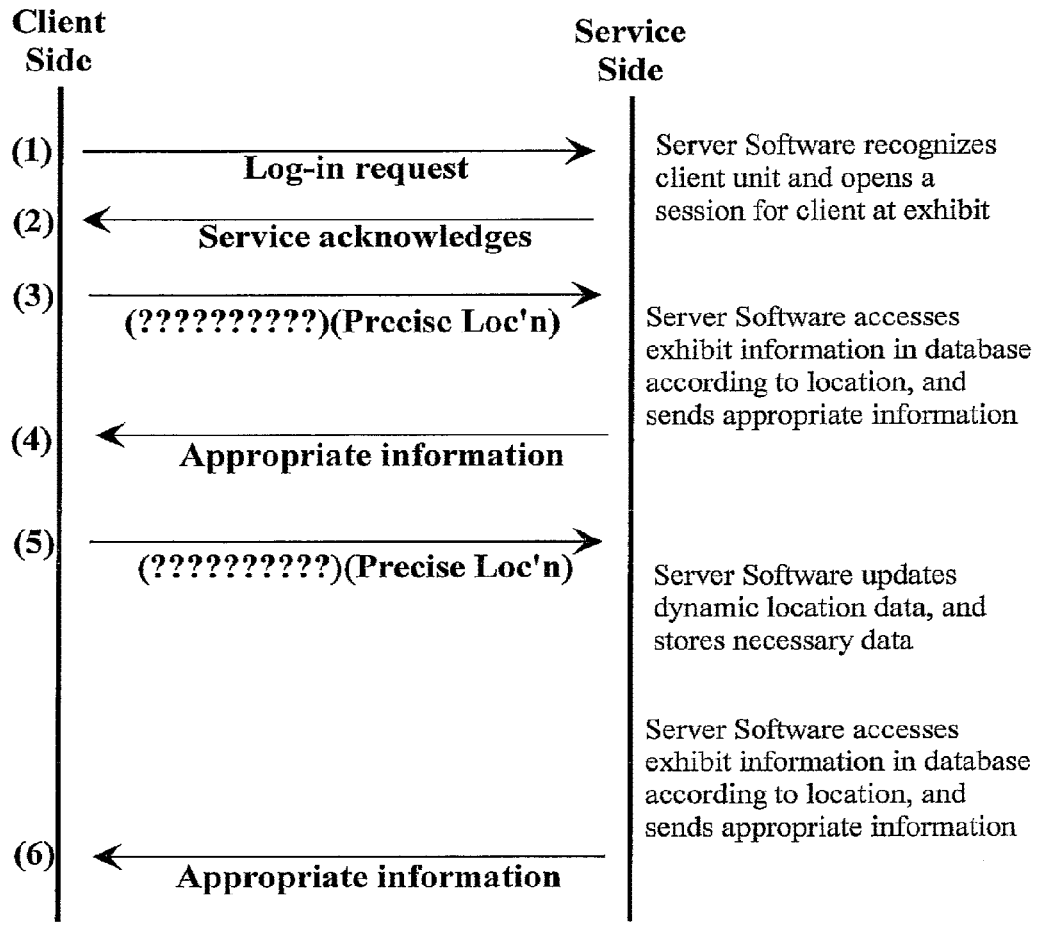
FIG. 6a is a timing diagram illustrating steps in information access according to an embodiment of the invention.

In this situation, a visitor registers at the exhibit site and is provided with a working client device. For purposes of description assume the device renders downloaded information to the visitor by audio through a single earphone. FIG. 6a is a flow diagram depicting communication between the Internet service in this embodiment of the invention and the client device expanding on the loop of steps 103, 105, and 107 of FIG. 4, and including database access interface 107 shown in FIG. 5.

In this diagram the client side is depicted as a vertical line on the left of the diagram, and the server side by a vertical line on the right side. Communication is shown by arrows between the two sides, manipulations wholly accomplished on one side are shown on that side, and time is on vertical scale, advancing top down.

After initialization, at step 1, a log-in request goes from the device to the server. The server recognizes the client unit, and opens a session for the client unit at the exhibit. This session is software managed at server 13 (FIG. 5), and may be one of a very large number of sessions being managed for different devices and clients.

Once the client unit is identified and a session is opened, the service acknowledges the log-in. At step 3 a data request is sent by the client device. There are a number of protocols under which data requests may be made. In one protocol, data requests are made at pre-programmed time intervals, such as every ten seconds. In an alternative protocol no data request goes to the server unless a user of the client device initiates the request. There may be other protocols, and there may also be an interface under which a user may switch from one protocol to another.

In any case, when a data request goes to the server (step 3) that request is accompanied by a precise location for the device. In outdoor sites this position may be the result of GPS coordination, or determined by a local position system. In indoor sites the position will typically be determined by a local system as described above.

In this example, in response to the request at step (3) the server accesses exhibit information according to position (location) and sends appropriate information. Typically, in this situation, where the device is the client, provided at a site for temporary use by a user, there is no server-stored user profile which may be used for further filtering of requests. However, the information accessed and sent may be selected by more dimensions than just the instantaneous position. The device's (user's) movement may be used as well, and the rate and direction of movement, or recent history of movement.

After the service determines the information to be sent, that information goes to the client device (step 4). At step (5) another data request is sent by the device to the server, and the server, in response, updates the dynamic location and history data for the session, and stores the necessary data for the session. At any point in time, then, the system knows the precise location of the client device, the previous locations, providing a track record including direction and rate, and can make future predictions as well, based on past movement. There may be included an interface for a client to, for example, retrace the history of a session, and so on.

At step (6) the server has again accessed appropriate information about an exhibit and sent that information along to the client device. When a user is finished with a tour and turns in the temporary client device, a worker at the site may cause a document to be printed describing the user's tour, as a souvenir. This document may include boilerplate elements about specific exhibits, which may be organized and presented according to the session history.

Once the tour is finished, and any peripheral services such as the souvenir document, is provided, the device is turned off, or a signal is sent terminating the session. The server software 107 may archive some information (# of visitor, length of tour, etc., for statistical purposes, for example). Then the session is erased. A new session will be initiated the next time the specific device is activated with a new user.

User as Client—

In other embodiments the device, the Internet appliance that is used to access the server and download information, is owned by, or at least registered to a specific user. In these embodiments the user will typically be a subscriber to the service, and, in the process of subscribing, the user will have entered a considerable amount of information. At a minimum the service will have the user's address, name, and such identity information. At another level, according to user preference, the user may supply considerable additional information, including data about age, gender, education, occupation, specific areas of interest, and so on, perhaps prioritized. There will be levels of service that can be provided to users who are willing to subscribe to the higher levels and to provide the kinds of user-profile information that will be required to provide the higher levels of service. Further services may require such as credit card information, deposit accounts, ability to access accounts for payment for services, and so on.

In any case, subscribers will have each a user profile to some depth, determined by the subscriber. In addition to the raw profile, a data record is kept for each subscriber, storing many kinds of information, including a history of on-line sessions, types of sessions, tours planned and taken, purchase history, and so forth. All of the archived information for a subscriber is cross-referenced and may be accessed by the subscriber for many purposes, and by the service for other purposes, with permission of the subscriber. Many of these additional services and abilities are described in further detail below.

In the case of a user-related device, where a user is a subscriber and a user profile is kept, the range of services is much broader than described above for temporarily-assigned devices. In this example, continuous or frequent intermittent access is still the norm, just as described above for the temporarily-assigned devices.

Figure 6B:
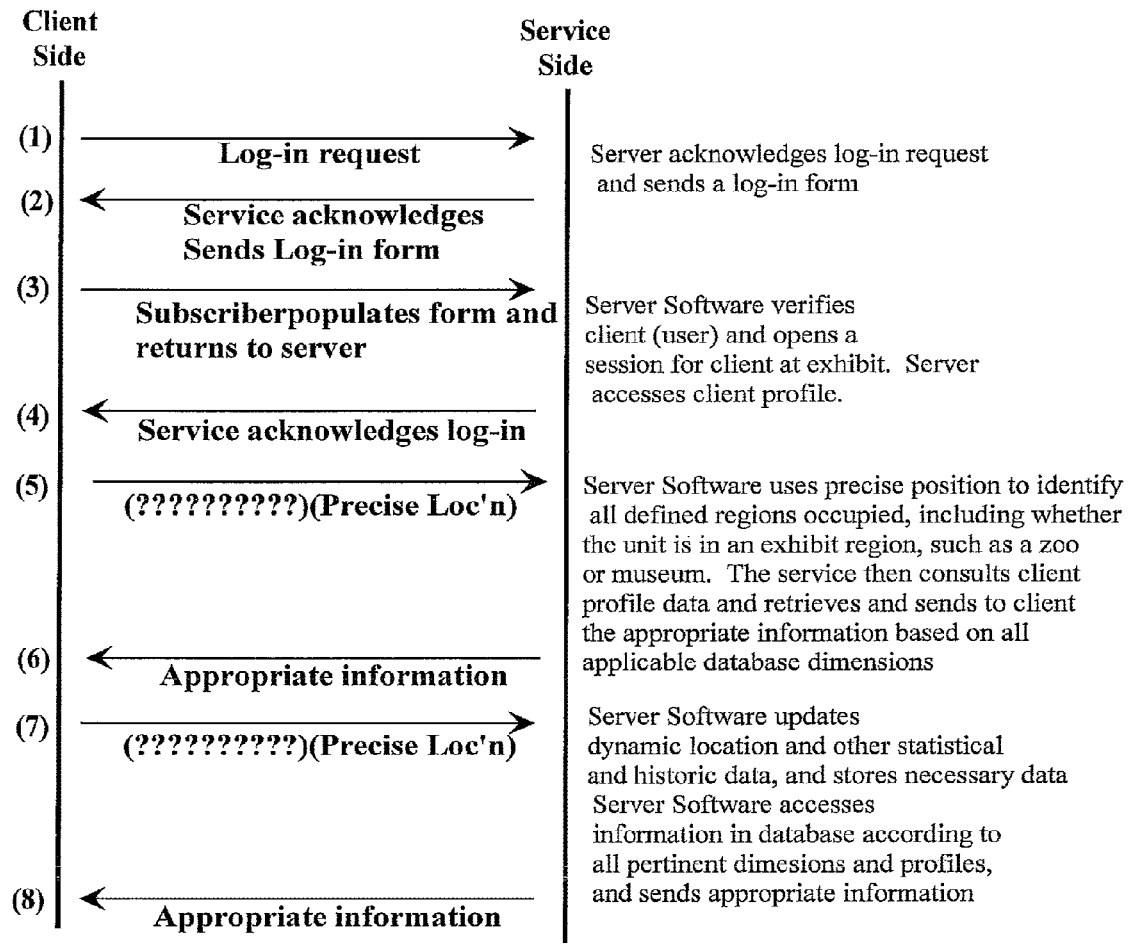
FIG. 6b is a timing diagram illustrating steps in information access according to an alternative embodiment of the invention.

In this example, assume the subscriber client initiates the device at any particular geographic point, which may any precise position on the surface of the Earth. FIG. 6b is a time diagram similar to that of FIG. 6a illustrating information access and provision in this case, where the client is the subscriber (person).

When the subscriber powers on the device (dedicated device) or signals for access to the service, such as by asserting a URL for server 13 (multi-purpose device), a log-in request goes to server 13 at step (1). In this case rather than an automatic log-in wherein the server recognizes the Internet appliance, as above, the server will identify the client/user/subscriber. This is done in a preferred embodiment by the server sending back a log-in form at step (2). At step (3) the subscriber has populated the form and sends it back to the server. This may be done by entering data in the form fields, or in some cases, the form-filling may be automatic, and even transparent to the client.

In response to the filled-in form, the Server Software verifies the client (user) and opens a session for client. The Server also accesses a client profile, if available, and client history. The Server then acknowledges verification to the user device in step (4). The client is now involved in an active session with the service, and may send information requests. As previously described in the case for the unit as client, the information requests may be automatic, timed requests, say one every two minutes, or the system may wait for the client to initiate a request, such as through a graphic user interface, or there may be some combination.

In any case, at step (5) an information request goes to the service, accompanied by a precise location, which may come from GPS in outdoor locations, and from a local positioning system in many indoor locations, as previously described. The server now may respond in a number of different ways, depending on circumstances. Server Software uses the precise position to identify all defined regions occupied, including whether the unit is in an exhibit region, such as a zoo or museum. The service then consults client profile data and retrieves and sends to client the appropriate information based on all applicable database dimensions (Step 6).

There are a broad variety of possibilities. For example, the user may be identified as being within an exhibit site, such as the Met as in previous examples above. The server may in this case behave and respond to information requests just as described above for the case of temporarily assigned devices. In some cases, the subscriber may have a special relationship with the exhibit, such as being a lifetime donor for a zoo, and this information may be a part of the user profile. In such cases there may be special services provided by the service, often in cooperation with the enterprise hosting the exhibit.

As another example, according to position returned with an information request, the client may not be in a specially choreographed site, but at-large. Geographically roaming might be an apt description. In this case the service may, through access to the client profile, determine that the client is especially interested in this session in U.S. Civil War information, and may return information about sites and exhibits of interest within a pre-defined range of the client position, or within a defined region.

In another example, developed more fully below, the client profile may indicate a client pre-planned itinerary, and return information according to different interest dimensions according to location, including defined regions associated with the location.

At step (7) the client's device sends another information request, either automatic or user-initiated. The server in response updates dynamic location and other statistical and historic data, and stores necessary data. This action is continuing in a session to develop and store a complete record of user locations, static and dynamic, and all user activities. The Server Software also accesses information in database according to all pertinent dimensions and profiles, and sends appropriate information in step (8).

The process continues throughout a client session, with more requests to the server, and more data accesses and deliveries to the client.

Fixed Access Uses of System

The unique structure of database 14 (FIG. 5), wherein information about a broad variety of subjects is cross-referenced in several dimensions, such as geographic position in defined regions and precise locations, by time, and also by information type relative to client interest categories, is described in some detail above. This unique cross-referencing and ability to access information by these dimensions provides an opportunity for a range of unique services that do not require use of and interaction with a portable device.

Figure 7:
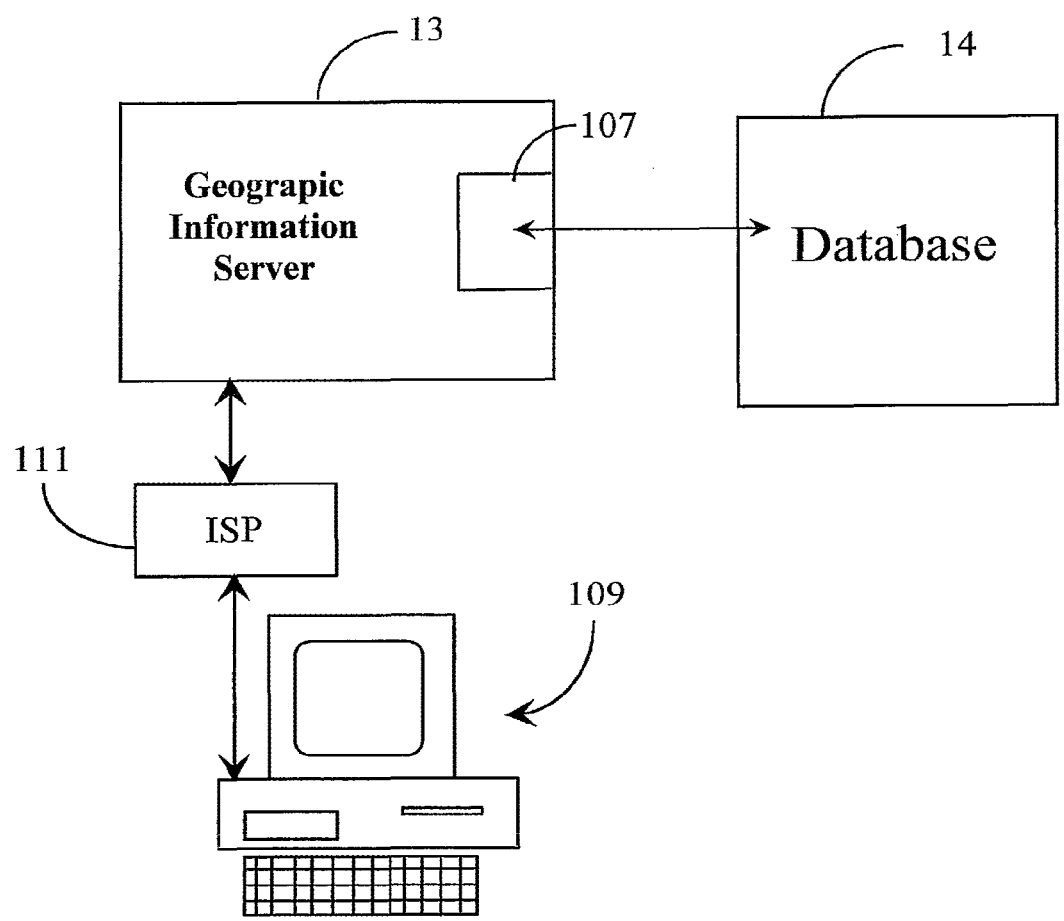
FIG. 7 is a block diagram illustrating architecture for accessing and using the database in embodiments of the invention by a relatively fixed device, such as a PC.

In another aspect of the invention the system of the invention may be used for a variety of unique services not involving a particularly portable client device, or real-time knowledge or input of the client's geographic position. In this aspect FIG. 7 is a diagram depicting access to server 13 by a client using a desktop PC, such as the client may have in a home or business.

Tour Planning—

One unique use of the system is in tour planning by subscribers. A subscriber using a desktop computer 109 (for example), connecting to server 13 through an ISP 111 (for example), is provided with a unique service for planning tours and trip itineraries. In one embodiment the subscriber, logging on to server 13, after log-in and authentication, is presented with a Graphical User Interface (GUI) having hyperlinks for various available service, one of which is for trip planning. By selecting this hyperlink the subscriber is presented with a new GUI with a range of parameter fields for planning a trip.

Figure 8:
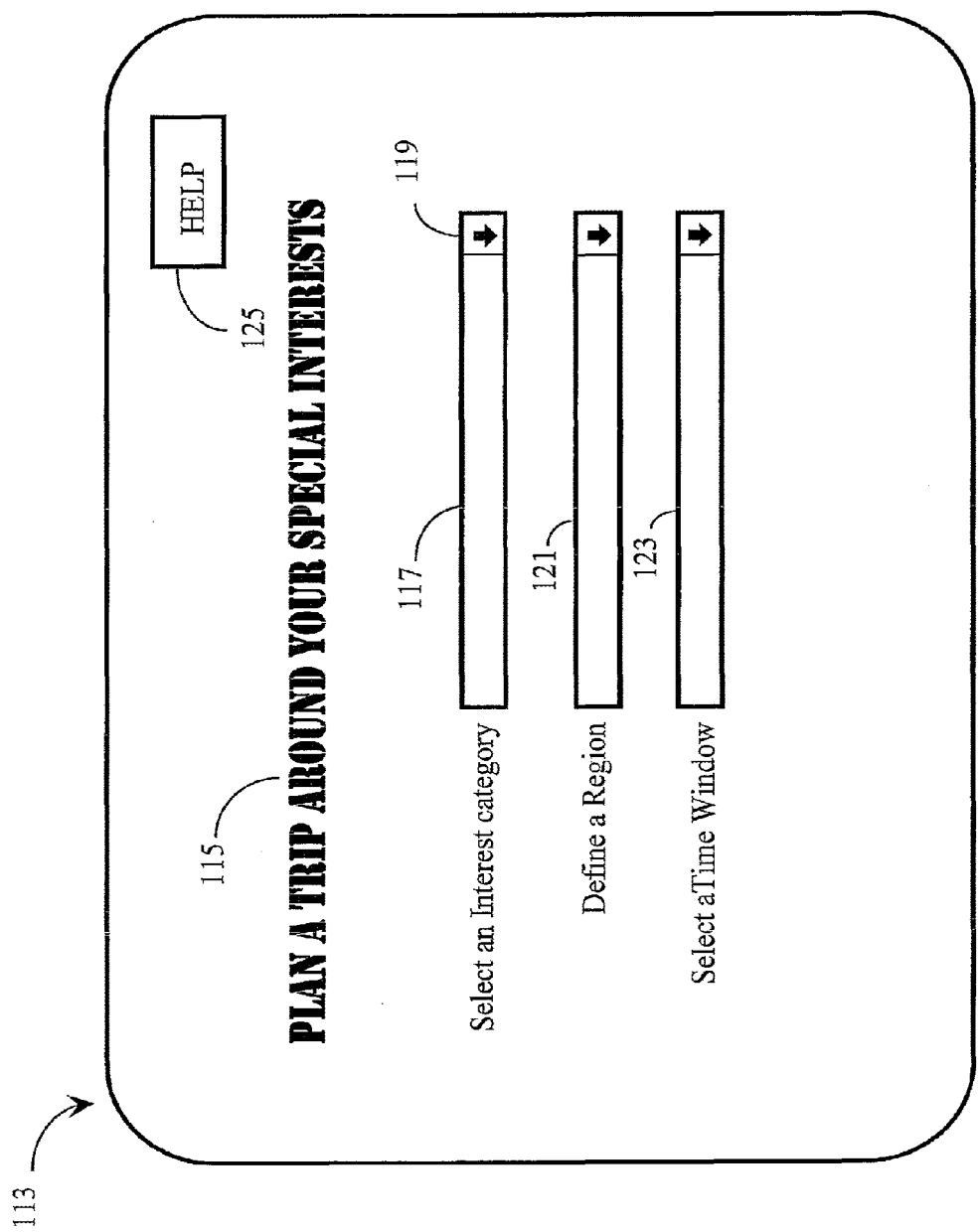
FIG. 8 is an exemplary interface for trip planning in an embodiment of the invention.

FIG. 8 is an exemplary interface 113 for trip planning in an embodiment of the invention. Title 115 identifies the interface, and there are three input fields in this simple example, field 117 for selecting an interest category, field 121 for defining a region for the trip, and field 123 for selecting a time window. A help link 125 links the subscriber to help functions if needed.

In field 117 the subscriber provides input for an interest to define the trip. Interest categories were defined to some extent above. For example, interests may be such as sculpture, music, American history, the Gulf War, rare books, antique collections, beat poetry, and so forth. A constraint is that interests to be input must be interest dimensions defined for the database, or the database cannot function according to the dimension.

In a preferred embodiment server 13 is enabled to deal with natural language input, so a subscriber may type in, for example, "Civil War", or "War of Rebellion", or "War between North and South", or some other natural language input. The system has a parser function for selecting significant nouns, and using these to determine most probable defined interest. In some cases in this mode, the server may come back with a pop-up query to further define the interest. For example, the user may input "War between North and South" and the system may come back with "U.S. Civil War? (Yes) (No). To which the subscriber is expected to respond.

In this manner the system may take typed input and arrive at a defined interest dimension. There may also be further interrogatories, such as defining time ranges for interest. A person interested in the U.S. Civil War may be interested only in one particular year of the Civil War.

Alternatively to the above, the subscriber may use a drop-down menu activated by arrow 119, in which case a menu of interest dimensions will be displayed, and the user may point-and-click, or scroll to highlight and select, techniques that are well-known in the art. In this facility, because there are numerous interest dimensions defined in the system, dimensions may be presented first by category, such as Art, war, and so forth, and upon one of the higher level categories being selected, a new drop-down list providing further definition is displayed. Again, when a defined interest dimension is finally selected, additional information may be solicited.

In field 121 the subscriber selects a region for the trip. Again, natural language input can be used, or the subscriber may use the drop-down menu method, and the system may respond with interrogatories to refine the selection. For example, the subscriber may have selected Modern Art as an interest, and now defines Spain as a region. One further dimension is sometimes required for the system to perform the unique trip-planning function. This is a time window selectable via field 123. The time window is a range in time when the subscriber wishes to make the trip. This, of course, will always be a future window. The same kinds of input characteristics as described above are operable for field 123.

One reason the time dimension is needed is that for many interest categories, certain exhibits displays, auctions, and the like may or may not be available at certain times. The database is maintained on a continuing basis with new information. For example, given one particular month in a coming year, the data base may list one matrix of displays and exhibits for modern art in Spain, and for another month, the matrix may be somewhat, or even radically different. On the other hand, for some interest categories the time window may be irrelevant. A subscriber may, for example, have selected Spanish villages in the Basque region as an interest, and the villages will be the same over very long periods of time.

Once the input is made, the server software loosely indicated by element 107 in FIG. 7 queries the database, applies pre-programmed rules, and builds one or more itineraries of interest for consideration by the subscriber. Staying with the present example of Modern Art, Spain, and assuming a time window of the last two weeks in July of the year 2000, the server software enters the database, determines all of the Modern Art exhibits and displays in Spain, which are tagged by location and defined subregions (see above for defined GPS regions) for the time window, and builds one or more itineraries for a proposed trip/tour.

In building the candidate tour(s) the system may apply a number of rules. One such rule has to do with location of major airports and/or ports of entry. This rule is applied if the subscriber profile indicates the subscriber is likely to begin such a trip from, say, the U.S. or Japan. Beginning with a major airport, for example, the system will find exhibits in the interest dimension within easy access distance of this potential arrival point. The system will apply a time relative to the total time window for visiting these close sites, say two days for the number of sited selected, then the system will range to another region near the arrival point, and do the same. In this manner one or more candidate itineraries are built around the input dimensions.

The next steep is for the system to present the candidate itineraries to the subscriber, which may be done in several ways. The subscriber may be presented with, for example, a sequential list of places (cities and towns, for example), the stopover times, and a list of all of the exhibits to be visited at each stopover. There may also be, for example, a map showing the same information, to make the itinerary more graphic. The subscriber is now given an interface for selecting one of the candidates, and than is also allowed to make alterations. The subscriber may, for example, through a GUI and input field interface, delete exhibits, delete stopovers, re-arrange the order of stopovers, and so forth, until satisfaction is struck.

Tour Implementation—

Once a tour is planned, it remains to implement the tour, if the subscriber intends to make the trip.

By implementation is meant actually buying the airline tickets into and out of the point of arrival in Spain, say Madrid, for the example Modern Art tour. Also all of the overnight accommodations necessary and travel between stopover locations on the tour; all of the details of actually making the tour. For this purpose a number of facilities are provided. A subscriber may, for example, jump from the display provided by server 13 to the home page of a major airline, where reservations may be made and paid for, and may locate and jump to local travel services and overnight accommodations in all of the various places on the tour, and accomplish thereby, all on-line, all of the implementing details for the tour.

Alternatively, a referral service is provided, whereby the subscriber may be transferred to a travel service which will offer experienced input to aid the subscriber in making all of the necessary accommodations. The travel service, cooperating with the service of the present invention, is then provided with a copy of the itinerary for the subscriber, and the travel service than performs the necessary functions. In the final implementation it will be understood that further alterations (hopefully minor) may still be made in the scope and progression of the planned tour.

Virtual Tours—

In an alternative embodiment of the invention a subscriber may define a tour around specific interest, regions, and time frames as above, then request from the service a virtual tour. The multi-dimensional database, for this embodiment, stores, or has access to multimedia files relating to the defined tour. For example all, or a portion of, pictures in museums of modern art in the various defined stopover points are accessible as high-resolution picture files. General interest pictures and sound files, or even video clips, may be available for the regions where the exhibits, museums and the like are located. In this way a fully graphic virtual tour is created, and presented to the subscriber. The tour, once created may, for example, be downloaded to the subscriber, provided on a CD-ROM, streamed in real time, or a combination of delivery means.

Professional Tour Creation—

In another embodiment of the invention, subscribers may be referred directly to professional tour planners, who intervene on the subscriber's behalf to use the services provided in embodiments of the present invention to create tours for the clients, and then verify and implement the tours. In some embodiments the professional tour planners are agents of the enterprise hosting the services of embodiments of the present invention, that is, the host of server 13.

In still another embodiment of the present invention a service is provided to professional travel planners and agents for creating group tours around interest dimensions, just as an individual subscriber creates an individual tour in the example above. In this embodiment the professional agent may create tours, verify the tours for pre-panned numbers of travelers, then advertise and fill the tours. In some cases the advertisement and filling of tours may be done through facilities of server 13 as well.

Variations—

In one variation of the above tour planning and implementation a subscriber may plan a tour, then download all of the pertinent information for use in storage with a portable device, such as a hand-held computer or a laptop computer. Then when the tour is actually taken, the subscriber person may, at each stopover, use the information stored to provide guidance and supplemental information on the tour. This variation has an advantage that the times and stopovers may be changed considerably, and the information is still useful, because it does not necessarily have to be accessed in the order of the original tour stopovers. Also, the information may be displayed on the computerized device, or may be printed out and carried along, or may be rendered as speech, for example, as needed and wanted. In still another variation the subscriber may implement the tour and save it in the subscriber's own profile information at the server. Then, when the subscriber makes the tour, he/she may access the service with a GPS-enabled hand-held device, as described in detail above, and receive real-time guidance according to position while in the field on the tour.

Additional Services and Applications

The combination of a multi-dimensional database wherein many types of information is cross-related by location, time, and interest categories, with or without a position-reporting appliance, affords opportunities for a wide variety of unique services beyond the services described in embodiments of the invention above. Several such applications in alternative embodiments of the invention are described below:

Corporate Applications

There are many services afforded for corporate and other enterprise and organization users of the GlobalRover system. For example, employees of an enterprise may be provided with portable, position-reporting units, and the enterprise may maintain an online database and cooperating software for use by the employees. The employees may then be provided with corporate information according to time and location as they move about among many enterprise locations. The real extent will of course vary from enterprise to enterprise. One corporation may be a multi-national business with locations all over the globe. In this case, information may be referenced by defined regions, which are defined by corporate facilities in different countries.

Other enterprises may have a single location, and information may then by organized by defined regions within the location. Within one building, for example, an electrical maintenance worker may be provided with electrical diagrams and schematics pertinent to a building according to his/her location in the building. Workers checking underground pipelines and cables may be provided with charts of the underground facilities in the immediate vicinity of the worker's location just as though the portable device might be a radar machine seeing under the surface. In this case the diagram might change as the worker moves, according to the direction and speed of movement. The kinds of information that may presented dynamically by location, extrapolating from the examples just given, are truly very large.

In still other embodiments it will not be necessary that a worker or employee of an enterprise have a location-reporting appliance, in the sense that the appliance automatically reports location to the remote database. A network-connected appliance without, for example a GPS system or another position pinpointing system may be used by a person to enter location; either the actual location or another location of interest, and the system will then transmit the information associated with the location.

Locating Users Through Devices

In another embodiment, because the system has user profiles, and users carry portable devices that report position, the system may be configured in some embodiments to report locations of registered persons. Such an application may be used by, for example, by a delivery service to track locations of delivery trucks/drivers. A supervisor may then make decisions based upon mapped employee location. This or a similar application is useful for all sorts of fleet enterprises, delivery services, rental car agencies, postal services, and many more. In applications wherein children have a location-reporting device, the system can locate missing or lost children In the case of children, as mentioned above, the unit need not be a two-way device like the appliances described above. A device according to the invention may be simply a box having GPS and an Internet connection reporting position to the remote system (server 13). An authorized person (parent, police worker) may access the system and find the location of any registered user that has an operating device.

The skilled artisan will recognize that there are a variety of alterations that may be made in the embodiments of the invention thus far described, without departing from the spirit and scope of the invention. For example, the nature of the appliance used may vary, with the requirement that there be a position determining system upon which selection of information may be predicated. There may be for example one of either a local position determination system (indoor application) or a GPS system; or both may be present. In the selection of information to be provided to a client, simple position may be used, or position data derived from simple position reported over time may be used, or both.

Because Internet access is not uniformly available in all regions of the planet, ability to download chunks of information to a portable device is important in various aspects of the invention. The information may be refreshed an upgraded at periodic intervals that access is available, such as kiosks in various places.

In some embodiments there may be an interface for a user to interface with the service, as exemplified at the appliance. Information may thus be cached, rather than delivered to the client in a steady stream, and the client can control the presentation, and the mode of presentation. There are many such alternatives within the spirit and scope of the invention, and the scope of the invention is therefor defined by the claims that follow.

What is claimed is:

1. A method of providing predictive advertising, the method comprising:
   receiving a first position of a portable computing device, the first position comprising a first longitude and a first latitude;
   receiving a second position of the portable computing device comprising a second longitude and a second latitude, wherein the second longitude is different than the first longitude or the second latitude is different than the first latitude;
   determining a prediction parameter comprising a movement direction or movement rate based on the first position and the second position;
   predicting a third position where the portable computing device is going to be, wherein the third position is based on the received second position and the prediction parameter;
   selecting an advertisement based on the prediction of where the portable computing device is going to be; and
   providing a notification to a service provider within a specified threshold distance of the third position, the notification indicating a pending arrival of the portable computing device or of a user of the portable computing device.

2. The method of claim 1 wherein the received first position or received the second position has been communicated through a cellular link.

3. The method of claim 1 wherein the received first position and the received second position were determined by the portable computing device using a GPS signal.

4. The method of claim 1 wherein the advertisement is further selected based on preferences of a user of the portable computing device.

5. The method of claim 1 wherein the advertisement is further selected based on an indication of an age, gender, education, or occupation of a user of the portable computing device.

6. The method of claim 1 wherein the advertisement provides an indication of a service available within a specified threshold distance of the third position.

7. The method of claim 1 wherein the advertisement provides an indication of a service related to the third position.

8. The method of claim 1 wherein the advertisement provides an indication of a service available within a specified threshold distance of the third position comprising one or more of: a restaurant location and availability of overnight accommodations.

9. The method of claim 1 wherein the advertisement provides an interface to make a reservation with the service provider.

10. The method of claim 1 wherein the advertisement is for a service within a pre-defined range of the third position or within a pre-defined region also containing the third position.

11. The method of claim 1, wherein the portable computing device is coupled to a delivery vehicle, and
wherein the advertisement is transmitted to a second device other than the portable computing device and the transmitted advertisement provides an indication of the third position.

12. The method of claim 1 wherein selecting an advertisement, based on the prediction of where the portable computing device is going to be, is automatic.

13. A computer-readable memory storing instructions configured to, in response to being executed by a computing system, perform operations for providing predictive advertising, the operations comprising:
receiving a first position of a portable computing device, the first position comprising a first longitude and a first latitude;
receiving a second position of the portable computing device comprising a second longitude and a second latitude, wherein the second longitude is different than the first longitude or the second latitude is different than the first latitude;
determining a prediction parameter comprising a movement direction or movement rate based on the first position and the second position;
predicting a third position where the portable computing device is going to be, wherein the third position is based on the received second position and the prediction parameter;
selecting an advertisement based on the prediction of where the portable computing device is going to be; and
providing a notification to a service provider within a specified threshold distance of the third position, the notification indicating a pending arrival of the portable computing device or of a user of the portable computing device.

14. The computer-readable memory of claim 13 wherein the advertisement is further selected based on preferences of a user of the portable computing device.

15. The computer-readable memory of claim 13 wherein the advertisement is further selected based on an indication of an age, gender, education, or occupation of a user of the portable computing device.

16. The computer-readable memory of claim 13 wherein the advertisement provides an indication of a service available within a specified threshold distance of the third position.

17. The computer-readable memory of claim 13, wherein the portable computing device is coupled to a delivery vehicle, and
wherein the advertisement is transmitted to a second device other than the portable computing device and the transmitted advertisement provides an indication of the third position.

18. The computer-readable memory of claim 13 wherein the advertisement is for a service within a pre-defined range of the third position or within a pre-defined region also containing the third position.

19. A predictive advertising server comprising:
a transceiver configured to:
receive a first position of a portable computing device, the first position comprising a first longitude and a first latitude; and
receive a second position of the portable computing device comprising a second longitude and a second latitude, wherein the second longitude is different than the first longitude or the second latitude is different than the first latitude; and
a processor and circuitry configured to;
determine a prediction parameter comprising a movement direction or movement rate based on the first position and the second position;
predict a third position where the portable computing device is going to be, wherein the third position is based on the received second position and the prediction parameter; and
select an advertisement based on the prediction of where the portable computing device is going to be;
wherein the transceiver is further configured to provide a notification to a service provider within a specified threshold distance of the third position, the notification indicating a pending arrival of the portable computing device or of a user of the portable computing device.

20. The predictive advertising server of claim 19 wherein the advertisement is for a service within a pre-defined range of the third position or within a pre-defined region also containing the third position.

* * * * *